U S 012226909B2

(12) United States Patent
Peng et al.

(10) Patent No.: US 12,226,909 B2
(45) Date of Patent: Feb. 18, 2025

(54) ROBOTIC DEVICE WITH TIME-OF-FLIGHT PROXIMITY SENSING SYSTEM

(71) Applicant: STMICROELECTRONICS, INC., Coppell, TX (US)

(72) Inventors: Cheng Peng, Plano, TX (US); Xiaoyong Yang, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 253 days.

(21) Appl. No.: 17/884,492

(22) Filed: Aug. 9, 2022

(65) Prior Publication Data

US 2023/0032490 A1 Feb. 2, 2023

Related U.S. Application Data

(62) Division of application No. 16/230,302, filed on Dec. 21, 2018, now Pat. No. 11,453,123.

(60) Provisional application No. 62/610,607, filed on Dec. 27, 2017.

(51) Int. Cl.
   *B25J 19/02* (2006.01)
   *B25J 9/16* (2006.01)

(52) U.S. Cl.
   CPC .......... *B25J 9/1664* (2013.01); *B25J 9/1694* (2013.01); *B25J 19/021* (2013.01)

(58) Field of Classification Search
   CPC ...... B25J 9/1664; B25J 9/1694; B25J 19/021; B25J 9/1676; B25J 19/06; G05B 2219/40202; G05B 2219/40544
   USPC ...................................................... 700/258
   See application file for complete search history.

(56) References Cited

U.S. PATENT DOCUMENTS

| 8,306,684 | B2 * | 11/2012 | Nakano | G05D 1/024 701/25 |
|---|---|---|---|---|
| 2010/0049391 | A1 * | 2/2010 | Nakano | G05D 1/024 701/23 |
| 2010/0076641 | A1 | 3/2010 | Van Den Berg | |
| 2012/0095575 | A1 | 4/2012 | Meinherz et al. | |
| 2012/0283905 | A1 * | 11/2012 | Nakano | G05D 1/0214 701/25 |
| 2012/0327190 | A1 | 12/2012 | Massanell et al. | |
| 2013/0211782 | A1 | 8/2013 | Rosenberg et al. | |
| 2014/0067121 | A1 * | 3/2014 | Brooks | B25J 9/1676 700/255 |
| 2014/0067126 | A1 | 3/2014 | Watanabe et al. | |
| 2014/0074291 | A1 | 3/2014 | Emoto et al. | |
| 2014/0244037 | A1 | 8/2014 | Scott et al. | |
| 2015/0094851 | A1 | 4/2015 | Kawabe et al. | |

(Continued)

FOREIGN PATENT DOCUMENTS

| CN | 104936520 A | * | 9/2015 | ........... A61B 5/0816 |
| CN | 105882519 A | * | 8/2016 | ............. B60Q 9/008 |

(Continued)

*Primary Examiner* — B M M Hannan
(74) *Attorney, Agent, or Firm* — Seed IP Law Group LLP

(57) ABSTRACT

A robotic device including one or more proximity sensing systems coupled to various portions of a robot body. The proximity sensing systems detect a distance of an object about the robot body and the robotic device reacts based on the detected distance. The proximity sensing systems obtain a three-dimensional (3D) profile of the object to determine a category of the object. The distance of the object is detected multiple times in a sequence to determine a movement path of the object.

20 Claims, 13 Drawing Sheets

(56) References Cited

U.S. PATENT DOCUMENTS

| | | | |
|---|---|---|---|
| 2015/0108332 A1* | 4/2015 | Murota | G01S 7/481 |
| | | | 250/221 |
| 2016/0016315 A1* | 1/2016 | Kuffner, Jr. | B25J 19/06 |
| | | | 901/49 |
| 2016/0158942 A1 | 6/2016 | Augenbraun et al. | |
| 2017/0030708 A1 | 2/2017 | Albert et al. | |
| 2017/0043484 A1* | 2/2017 | Kuffner | B25J 19/06 |
| 2017/0320212 A1* | 11/2017 | Frisk | B25J 19/06 |
| 2017/0326734 A1* | 11/2017 | Iida | B25J 9/1674 |
| 2018/0021954 A1 | 1/2018 | Fischer et al. | |
| 2018/0079079 A1 | 3/2018 | Gombert et al. | |
| 2018/0128919 A1 | 5/2018 | Ichikawa et al. | |
| 2019/0011929 A1* | 1/2019 | Maeno | G05D 1/0274 |
| 2019/0025849 A1* | 1/2019 | Dean | G06Q 10/087 |
| 2019/0061159 A1 | 2/2019 | Domae et al. | |
| 2019/0109977 A1* | 4/2019 | Dutton | H04N 25/443 |
| 2019/0176326 A1 | 6/2019 | Bingham et al. | |
| 2019/0187254 A1* | 6/2019 | Kappel | G01S 7/4808 |
| 2019/0193267 A1 | 6/2019 | Peng et al. | |
| 2019/0351558 A1 | 11/2019 | Park | |
| 2020/0397531 A1 | 12/2020 | Schrader et al. | |
| 2021/0001480 A1 | 1/2021 | Artes et al. | |

FOREIGN PATENT DOCUMENTS

| | | | | |
|---|---|---|---|---|
| CN | 106211304 A | * | 12/2016 | H04B 1/3838 |
| CN | 106796291 A | * | 5/2017 | B60R 21/00 |
| CN | 107201861 A | * | 9/2017 | B60J 5/10 |
| CN | 107486857 A | * | 12/2017 | B25J 9/1653 |
| CN | 111230927 A | * | 6/2020 | |
| DE | 102006045418 A1 | * | 4/2008 | B62D 15/028 |
| DE | 102015209214 A1 | * | 11/2016 | |
| JP | 5278283 B2 | | 9/2013 | |
| JP | 2015100554 A | * | 6/2015 | |
| JP | 2017205858 A | * | 11/2017 | B25J 13/085 |
| JP | 6402320 B2 | * | 10/2018 | B25J 11/001 |
| KR | 20050061775 A | * | 6/2005 | |
| KR | 20130014105 A | * | 2/2013 | |
| KR | 20180064969 A | * | 6/2018 | |
| WO | WO-2014036549 A2 | * | 3/2014 | B25J 9/1676 |
| WO | WO-2016063532 A1 | * | 4/2016 | B60R 21/00 |

* cited by examiner

ROBOTIC DEVICE WITH TIME-OF-FLIGHT PROXIMITY SENSING SYSTEM

BACKGROUND

Technical Field

The present disclosure is directed to robotic devices including proximity sensors for detecting an approaching object.

Description of the Related Art

Traditional robots are widely used in industrial environments, including heavy material handling, welding, and painting in the automotive industry. Usually, the traditional robots are kept apart from human beings for safety reasons. Along with the ongoing Industry 4.0, use of robots is being extended into many different industry segments and residential environments. In many emerging robotic usage scenarios, robots are required to work with human beings side by side in a non-controlled environment. For example, robots are moving freely and are not locked away or fixed in a working area. As such, various expected or unexpected objects could appear about a robotic device. It is important to design a robot which is able to be aware of the surrounding objects and react correspondingly.

Traditional object sensing techniques are proven to be deficient for such new robot use scenarios. Ultrasonic sensors must view a surface squarely or perpendicularly to receive ample sound echo. Also, reliable sensing by an ultrasonic sensor requires a minimum target surface area, which is specified for each sensor type. While ultrasonic sensors exhibit good immunity to background noise, these ultrasonic sensors are still likely to falsely respond to some loud noises, like the "hissing" sound produced by air hoses and relief valves.

Proximity style ultrasonic sensors require time for a transducer to stop ringing after each transmission burst, before they are ready to receive returned echoes. As a result, sensor response times are typically slower, which is disadvantageous for a robotic device responding in an un-controlled working environment. Ultrasonic sensors require a minimum sensing distance; namely, there are blind spots for ultrasonic sensors. Changes in the environment, such as temperature, pressure, humidity, air turbulence, and airborne particles, affect ultrasonic response. Targets of low density, like foam and cloth, tend to absorb sound energy, and may be difficult to sense at long range to an ultrasonic sensor.

BRIEF SUMMARY

Examples of the present disclosure are directed to a robotic device including one or more proximity sensing systems coupled to various portions of a robot body of the robotic device. The proximity sensing systems detect a distance of an object about the robot body such that reactions may be made based on the detected distance of the object. The proximity sensing systems may be controlled to obtain a three-dimensional (3D) profile of the object. Such detected 3D profiles may be compared with stored 3D profiles of known object categories such that the robotic device is able to categorize the object and react accordingly. In obtaining the 3D profile of the object, the detection range of the proximity sensing system may be adjusted.

To maintain a balance between processing speed and accuracy, the detection resolution, namely the amount of distance information detected on an object, may be adjusted based on the distance of the object. When an object is closer to the robot body, detection resolution will be increased. The detection resolution may be in a space domain, namely a number of distance detections for a unit area of the object, or in a time domain, namely a number of distance detections on an object in a unit period of time.

With multiple detected distance information of an object in a time sequence, a movement direction and a movement speed of the object is determined. Such movement direction and movement speed of the object may be used to predict a further movement of the object and may be compared with a movement trajectory of a moveable portion of the robot body to determine a reaction of the robotic device to the object.

BRIEF DESCRIPTION OF THE SEVERAL VIEWS OF THE DRAWINGS

In the drawings, identical reference numbers identify similar elements or acts unless the context indicates otherwise. The sizes and relative positions of elements in the drawings are not necessarily drawn to scale.

DETAILED DESCRIPTION

In the following description, certain specific details are set forth in order to provide a thorough understanding of various examples of the disclosure. However, one skilled in the art will understand that the disclosure may be practiced without these specific details. In other instances, well-known structures associated with electronic components and fabrication techniques have not been described in detail to avoid unnecessarily obscuring the descriptions of the examples of the present disclosure. The drawings are not necessarily drawn to scale, and some features are enlarged to provide a more clear view of particular features.

Unless the context requires otherwise, throughout the specification and claims that follow, the word "comprise"

and variations thereof, such as "comprises" and "comprising," are to be construed in an open, inclusive sense, that is, as "including, but not limited to."

The use of ordinals such as first, second and third does not necessarily imply a ranked sense of order, but rather may only distinguish between multiple instances of an act or structure.

Reference throughout this specification to "one example" or "an example" means that a particular feature, structure or characteristic described in connection with the example is included in at least one example. Thus, the appearances of the phrases "in one example" or "in an example" in various places throughout this specification are not necessarily all referring to the same example. Furthermore, the particular features, structures, or characteristics may be combined in any suitable manner in one or more examples.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
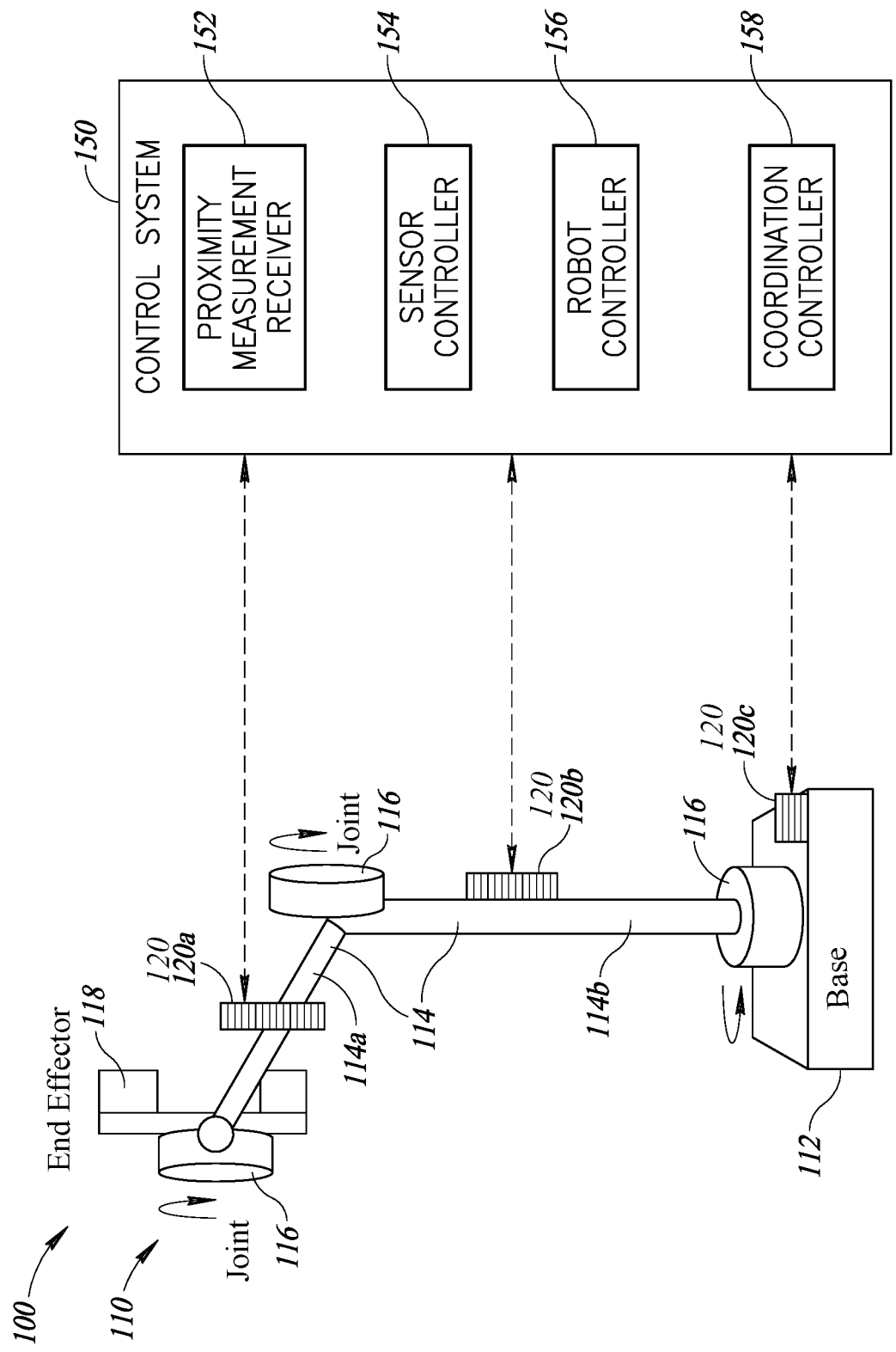
FIG. 1 illustrates an example robotic system.

The present disclosure is generally directed to a robotic system having multiple proximity sensing systems coupled to multiple portions of a robot body of the robotic system. The multiple proximity sensing systems each may detect a distance of an object, e.g., a human being or an obstacle, which the robot body may need to avoid, or to work together with. Based on the detected distance, the robotic system may react to the object being detected. The reactions may be in the operation of the proximity sensing system or may be in the operation of the robot body. With the included time-of-flight proximity sensors, the proximity sensing systems each may achieve much higher sensing resolution and speed that enable more comprehensive processing of the sensed data as included in the current disclosure. An illustrative example robotic system 100 is shown in FIG. 1. In this example, robotic system 100 may include a robot body 110, one or more proximity sensing systems 120, shown as 120a, 120b, 120c, and a control system 150. Control system 150 may be coupled to robot body 110 and proximity sensing system 120 electrically or communicatively to receive data therefrom and to control the operations and functions of robot body 110 and proximity sensing system 120. FIG. 1 only shows, for simplicity, the signal coupling links between control system 150 and proximity sensing system 120, which does not limit the scope of the disclosure.

Robot body 110 may include a base 112, and one or more moveable portions 114 (e.g., jointed arms), that are coupled to base 112, shown as pivoted through joints 116 for illustrative purposes only. One or more moveable portion 114 may include an end effector 118 that is coupled thereto. The coupling of moveable portion 114 and end effector 118 may be achieved through one or more joints 116. It should be appreciated that in the description herein, the base 112 and moveable portion 114 are defined relative to one another only for descriptive purposes, and neither limit the scope of the disclosure. For example, the base 112 might be a moveable portion relative to its own "base." Moveable portion 114b may be treated as a base for moveable portion 114 in the sense that moveable portion 114a moves, e.g., rotates, relative to moveable portion 114b, and portion 114b does not move relative to moveable portion 114a. Moveable portion 114b is moveable relative to base 112. It should be further appreciated that robot body 110 as shown in FIG. 1 is just an illustrative example of a robot body and does not limit the scope of the disclosure. A robot body may include different structures or additional structures than the example robot body 110 of FIG. 1, which are all included in the disclosure. For example, example robot body 110 may be a portion of a larger scale robot that overall serves as base 112 to robot body 110. Base 112 may be any platform of a robot or may be positioned on any platform of a robot, including, but not limited to, a locomotion platform capable of travelling at least one of in the air, in the water or on the ground.

Each proximity sensing system 120 may include multiple proximity sensing sensors 120, and may be coupled to various portions of robot body 110 in various means, which are all included in the disclosure. In an example, for a proximity sensing system 120 attached to a portion of a robot body, e.g., proximity sensing system 120b attached to moveable portion 114b, the multiple sensors thereof may be arranged to have a detection range that covers the full relative movement and reachable region of the relative moveable portion(s), e.g., moveable portion 114a, that is pivoted directly or indirectly thereto. For example, as both moveable portion 114a (that includes end portion 118) and moveable portion 114b are moveable relative to base 112 and are pivoted to base 112, a proximity sensing system 120 attached to base 112 may be arranged to have a detection range that covers the full relative movement and reachable region of moveable portions 114a and 114b. A relative movement region is a region of movement of a moveable portion 114 relative to its base 112, which is the immediately adjacent piece relative to the moveable portion. For example, the relative movement region of moveable portion 114a is relative to moveable portion 114b, which is a base for moveable portion 114a.

The detection range of a proximity sensing system 120 may be achieved through the fixed positioning arrangement of the one or more proximity sensors thereof and may be achieved through arrangement of the movement ranges, namely scanning ranges, of the proximity sensors 120 thereof.

Control system 150 may include a proximity measurement receiver 152, a sensor controller 154, a robot controller 156, and a coordination controller 158. Proximity measurement receiver 152 may be electrically or communicatively coupled to each proximity sensing system 120, or each proximity sensors 120 thereof, to receive the sensing data obtained by the proximity sensing systems 120.

Sensor controller 154 may be at least one of electrically or communicatively coupled to each proximity sensing systems 120 or each proximity sensor 120 thereof, to control the operations of proximity sensing systems 120 or the proximity sensors 120 thereof. The controlling of the sensor operations may include adjusting at least one of a detection range, a detection resolution, or a scanning speed of a proximity sensing system 120 or a proximity sensor thereof. A detection range is a range of a distance of an object(s) which a proximity sensor 120 is capable to detect. A detection range of a proximity sensing system 120 is the combination of all the detection ranges of the proximity sensors 120 included in the proximity sensing system 120. A detection resolution may include a resolution in space domain ("spatial resolution") or a resolution in time domain ("detection frequency"). Detection frequency is a frequency of a light signal emitting a proximity sensor. A scanning speed is an area detected/scanned by a proximity sensor 120 within a unit of time. Both detection resolution and scanning speed of a proximity sensor 120 are related to an amount of distance information the proximity sensor 120 obtained from an object and the processing of the information.

The controlling of at least one of proximity sensing system 120 or the proximity sensors 120 thereof may be effected at least one of electrically or mechanically. For example, the electrical control may be achieved through a gate control signal controlling the light emitting and receiving of a proximity sensor 120. The mechanical control may be achieved through controlling a mini-motor(s) coupled to a proximity sensor(s) of a proximity sensing system(s) 120.

Figure 2:
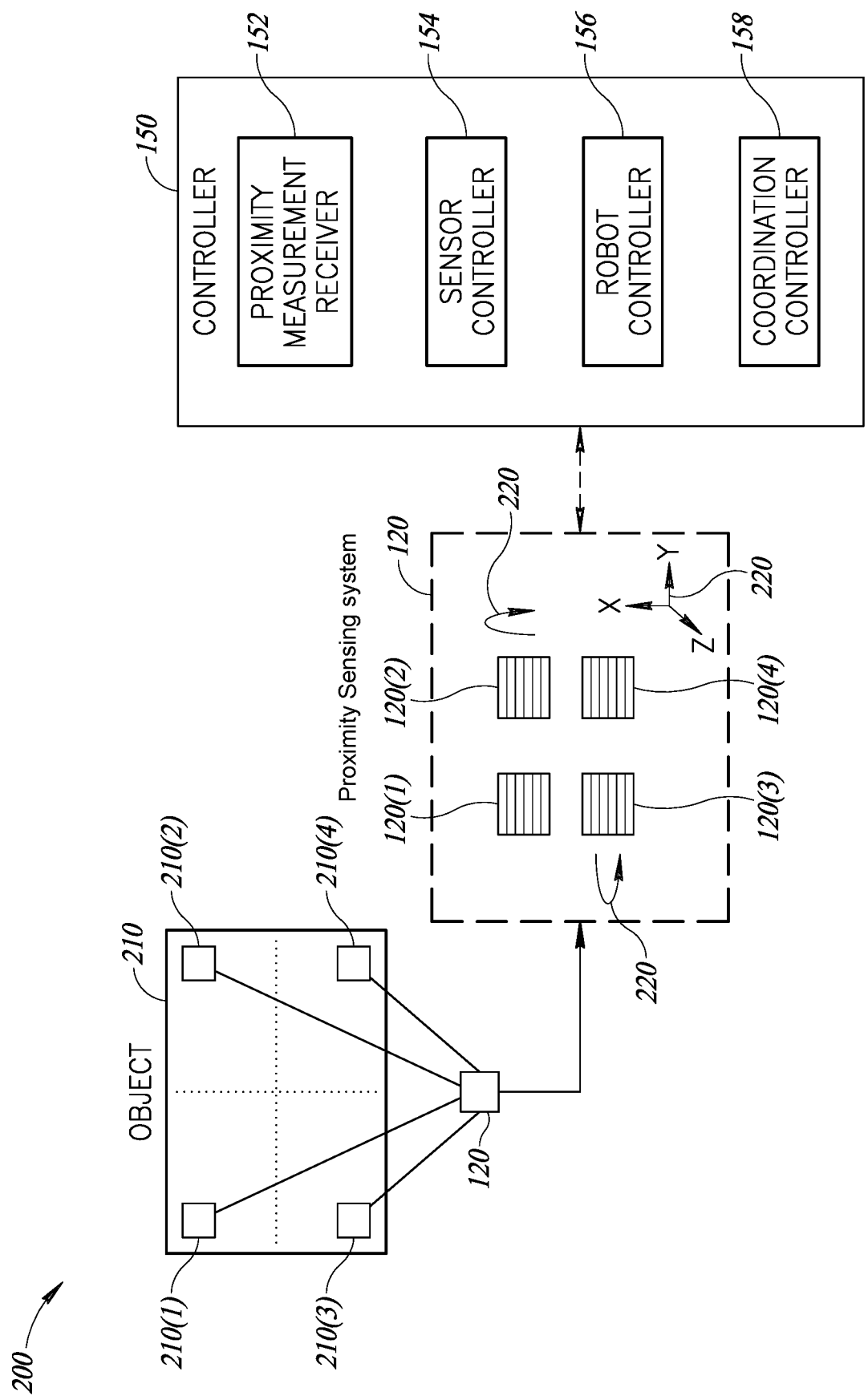
FIG. 2 illustrates an example proximity sensing system with a multi-zone sensing scheme.

FIG. 2 shows an example operation environment 200 to receive data from, and to control, a proximity sensing system 120. As shown in FIG. 2, an example proximity sensing system 120 may include multiple, shown as four, proximity sensors 120(1), 120(2), 120(3) and 120(4), which may be distinct proximity sensors or zones of a single proximity sensor as described herein. Proximity sensors 120(1), 120(2), 120(3) and 120(4) each may detect a respective region of an object 210, referred to as object zones 210(1), 210(2), 210(3) and 210(4). Specifically, proximity sensor 120(1) detects a distance of object zone 210(1) of object 210 to proximity sensor 120(1); proximity sensor 120(2) detects a distance of object zone 210(2) to proximity sensor 120(2); proximity sensor 120(3) detects a distance of object zone 210(3) to proximity sensor 120(3); and proximity sensor 120(4) detects a distance of object zone 210(4) to proximity sensor 120(4). It should be appreciated that each proximity sensor 120 may be able to detect multi-zone information of the corresponding object zone 210, which is described further herein.

Each proximity sensor 120 may be individually coupled to one or more mini-motors (not shown for simplicity) such that sensor controller 154 can control at least one of the movement or position of each proximity sensor 120. As shown in FIG. 2 as an illustrative example, movement 220 of proximity sensors 120, and the related detection range, may include linear movements in any directions within the X-Y-Z three-dimensional sphere. Movement 220 of a proximity sensor 120 may also include tilting or rotation in various directions. As appreciated, a movement 220 of proximity sensor 120 may change its detection range. The ability of sensor controller 154 to change the detection range of each individual proximity sensor 120 brings about various technical advantages. For example, proximity sensing systems 120 may individually or in coordination detect a three-dimensional ("3D") profile of an object 210. For example, by comparing the distance information/readings detected by the multiple proximity sensors 120 of a proximity sensing system 120, the relative depth of the multiple zones 210 could be determined, which is part of the 3D profile of object 210.

By moving proximity sensors 120 in various ways, more 3D profile information of object 210 may be obtained. For example, when the distances of object zone 210(1) and object zone 210(2) detected by adjacent proximity sensors 120(1) and 120(2) are within a first threshold range of one another, which, e.g., indicates sufficient flatness or smooth transition between object zones 210(1) and 210(2), sensor controller 154 may move the detection range of at least one of proximity sensors 120(1), 120(2) away from one another so that the edge of the flatness or the smooth transition area may be detected. When the distances of object zone 210(1) and object zone 210(2) detected by adjacent proximity sensors 120(1) and 120(2) are beyond a second threshold range of one another, which, e.g., indicates a sharp depth change between object zones 210(1) and 210(2), sensor controller 154 may control to move the detection range of at least one of proximity sensors 120(1), 120(20 toward one another so that more depth information between the original object zones 210(1) and 210(2) may be obtained. Such 3D profile information may help to single out an object 210 from at least one of the background or an adjacent different object 210. More description about multi-object detection is described herein.

Figure 3:
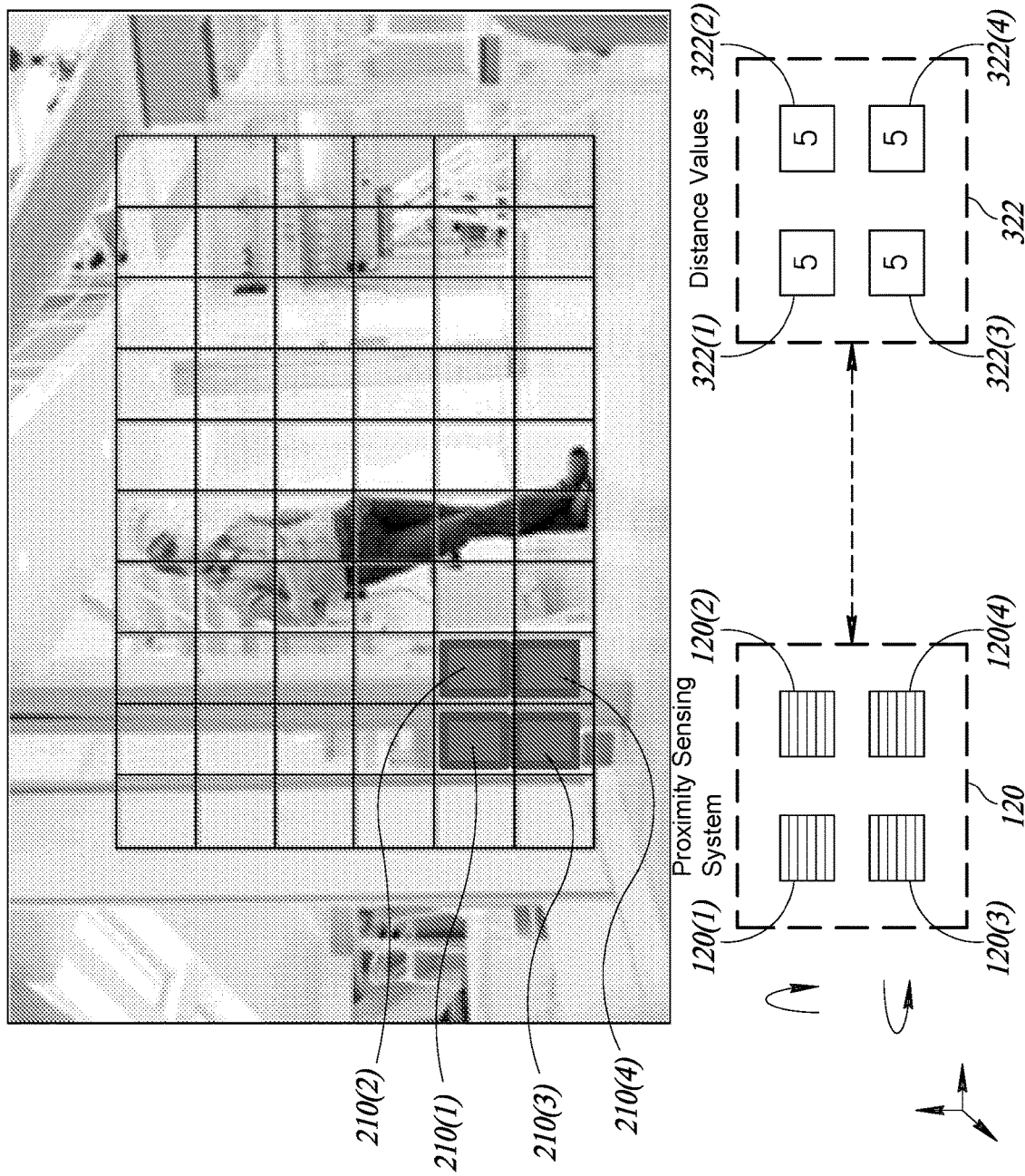
FIG. 3 illustrates an example operation of the example proximity sensing system of FIG. 2.
Figure 4:
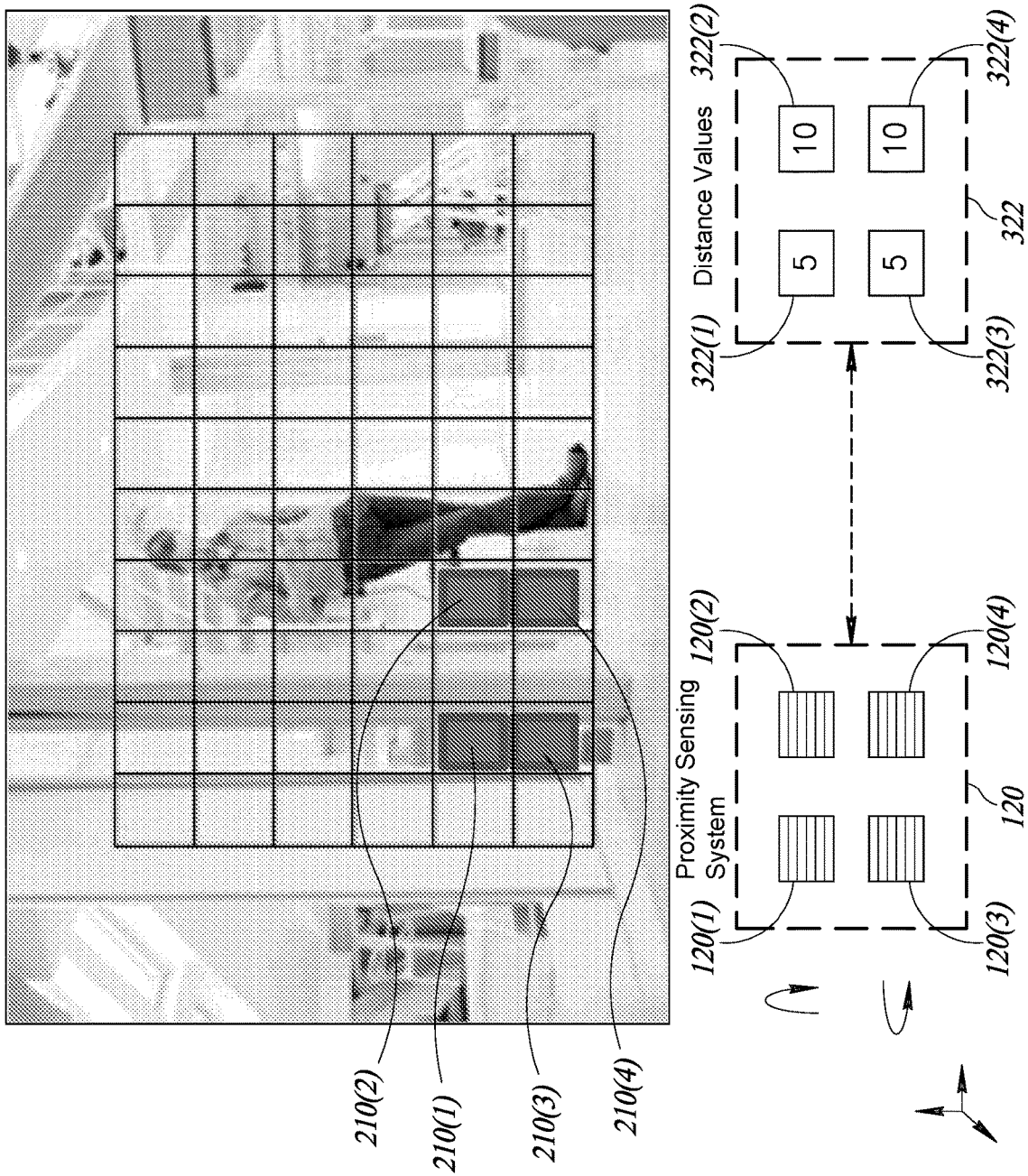
FIG. 4 illustrates another example operation of the example proximity sensing system of FIG. 2.
Figure 5:
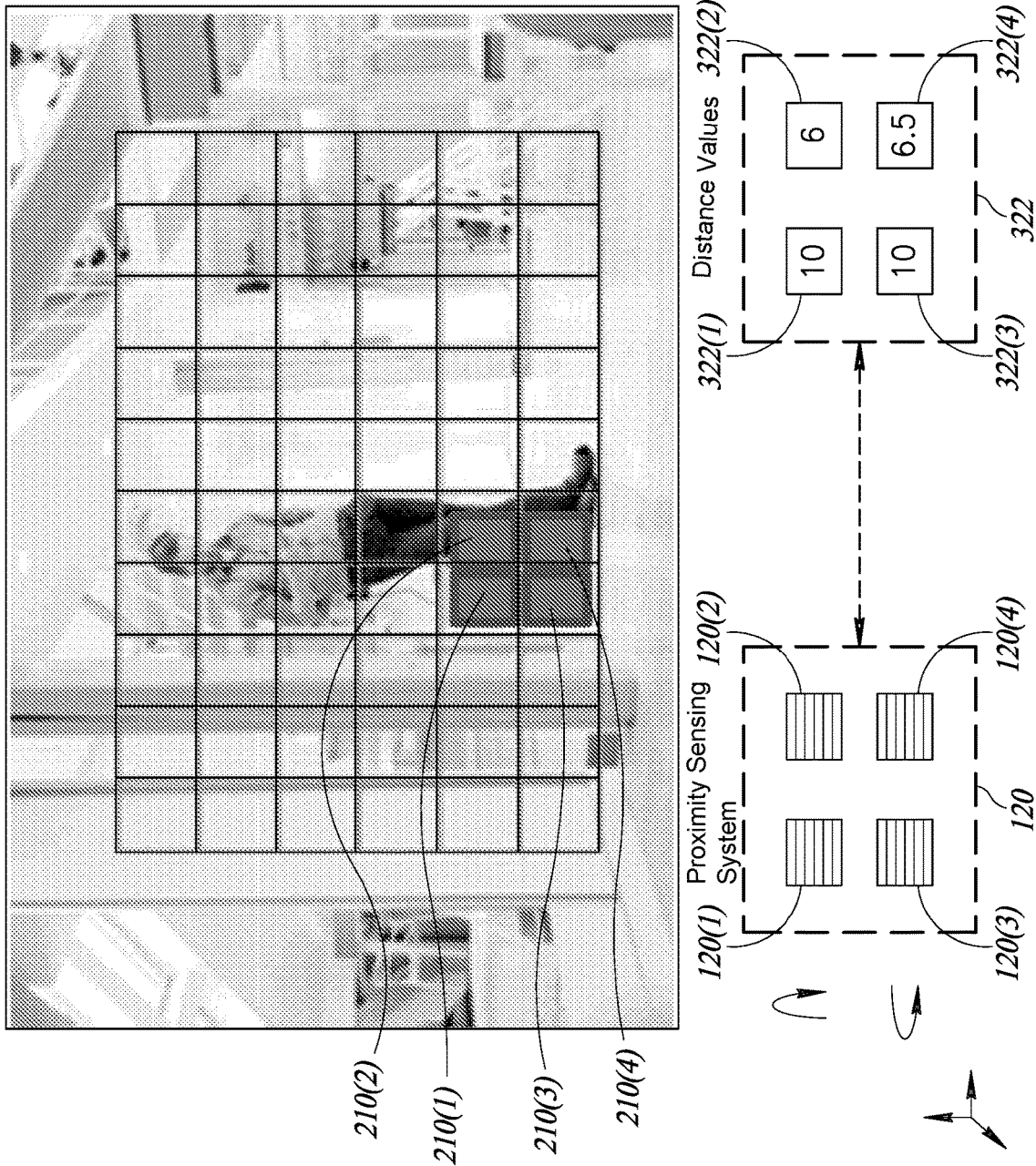
FIG. 5 illustrates another example operation of the example proximity sensing system of FIG. 2.

FIGS. 3-5 show example operations of adjusting the detection ranges of individual proximity sensors 120 in detecting a 3D profile of an object(s). FIG. 3 shows that proximity sensors 120(1), 120(2), 120(3), 120(4) detect object zones 210(1), 210(2), 210(3), 210(4), which all overlap a vertical pole 340 in the example residential environment. The distance values 322(1), 322(2), 322(3), 322(4) obtained by proximity sensors 120(1), 120(2), 120(3), 120(4) are all example value "5", which indicates sufficient flatness between/among object zones 210(1), 210(2), 210(3), 210(4). This "flatness" indicates the proximity sensors are all relatively equally spaced from the object being detected.

In FIG. 4, the sensor controller 154 controls proximity sensors 120(2) and 120(4) to move their detection range away from those of proximity sensors 120(1) and 120(3), and now the respective zones 210(2) and 210(4) cover a further background item. This is a change in the field of view of the proximity sensors 120(2) and 120(4). The distance values 322(1) and 322(3) obtained by proximity sensors 120(1), 120(3), remain "5", while distance values 322(2) and 322(4) obtained by proximity sensors 120(2), 120(4) are now "10", which shows a sharp variation in depth between zones 210(1)/210(3) and 210(2)/210(4) and identifies an edge of the vertical pole 340 and a different object spaced further from the vertical pole 340.

FIG. 5 shows that sensor controller 154 moves proximity sensors 120(1), 120(2), 120(3), 120(4) together further to the right from the object zones 210(2) and 210(4) of FIG. 4. Now in FIG. 5, object zones 210(1), 210(3) of proximity sensors 120(1) and 120(3) cover the background item and zones 210(2), 210(4) of proximity sensors 120(2) and 120(4) cover a new object (the two legs of the human being 540). The distance values 322(1), 322(2), 322(3), 322(4) obtained by proximity sensors 120(1), 120(2), 120(3), 120(4) are now "10", "6", "10", "6.5", which indicates that object zones 210(2) and 210(4) are of a different object than object zones 210(1) and 210(3). The difference between zones 210(2) and 210(4), "0.5," may meet a second threshold and may require that proximity of some sensors 120(1), 120(2), 120(3), 120(4) be moved closer to one another to obtain more depth information between object zones 210(2) and 210(4) to further clarify the 3D profile information about the object(s). The control system 150 may include various thresholds regarding the proximity sensor readings to control and adjust the fields of view of the proximity sensors 120, which are all included in the disclosure. Each of the proximity sensors may have a micro-motor associated with the proximity sensor to enable small adjustments of the position of the proximity sensor to change a field of view of the proximity sensor. With the variations in movement of the proximity sensors, the system can has overlapping fields of view of the proximity sensors and can compile the various depth measurements with the various positions to create the 3D profile of the object.

Such capacity to determine a 3D profile of an object 210 is advantageous for robot system 100 in that robot system 100 may choose to take different actions with respect to the detected objects 210 of different 3D profiles. For example, robot system 100 may differentiate between a human being and a background obstacle. Robot system 100 may also differentiate between an intended object 210 to work with and a foreign object 210 protruding into a working space of robot body 110.

In an example, coordination controller 158 may be configured to compare the detected 3D profile of an object 210 with stored, e.g., on a memory associated with control system 150 (not shown for simplicity), 3D profiles of various types of objects to determine a category/classification of the detected object 210. For example, a 3D profile of a human head may be used to determine whether a detected object 210 is a human-being. The stored 3D profiles may not need to be a full profile of the types of object and may include the 3D characteristics and identifiers of the types of objects. For example, sensor controller 154 may adjust a detection resolution of a proximity sensing system 120 or the proximity sensors thereof based on the classification of the detected object. For example, more detection resolution may be provided for an object 210 determined as a human being based on the 3D profiles.

Further, sensor controller 154 may control the operation of one or more proximity sensing system 120 based on a detected distance of an object 210. Sensor controller 154 may provide control signals to adjust at least one of a detection resolution or a scanning speed of a proximity sensing system 120 or the proximity sensors thereof. The detection resolution may include a spatial resolution and detection frequency. A spatial resolution refers to a number of detected object zones, e.g., 210(1), 210(2), 210(3), 210(4), within a unit area of an object 210. For example, the spatial resolution may be adjusted through adjusting the fields of view of proximity sensors 120 to be closer to one another or be turned away from one another. A detection frequency refers to a number of detection readings performed by proximity sensor 120 within a unit time period. Related to the detection resolutions, a scanning speed of moving a proximity sensing system 120 to scan a larger area may also be controlled by sensor controller 154. For example, sensor controller 154 may at least one of increase the detection resolution or decrease the scanning speed of the multiple proximity sensors 120 of proximity sensing system 120 when a detected distance of object 210 is smaller than a third threshold, e.g., within critical zone 620 of FIG. 6 Sensor controller 154 may at least one of decrease the detection resolution or increase the scanning speed of the multiple proximity sensors 120 of proximity sensing system 120, when the detected distance of the object 210 is larger than a fourth threshold.

The adjustment of a detection resolution in a space domain may be achieved through various approaches. One approach is to physically move the detection ranges of multiple proximity sensors 120 to be closer or further apart. Another approach is to selectively process or not to process the sensing data obtained by one or more proximity sensors 120. Other approaches to adjust a detection resolution in space domain are also possible, and are included in the disclosure.

It should be appreciated that when a time-of-flight proximity sensor is used for proximity sensors 120, each time-of-flight proximity sensor is able to detect a 3D profile of the relevant zone 210 in the detection range of the time-of-flight sensor. The detections zones of the single time-of-flight proximity sensor may also be controlled by sensor controller 154, e.g., by controlling the light emission angles of the light emitting element. Further details about multi-zone time-of-flight proximity sensor are provided herein.

Referring back to FIG. 1, robot controller 156 may be configured to control an operation of robot body 110 based on a detected distance of an object 210. As described herein, the one or more proximity sensing systems 120 or the proximity sensors thereof may each detect various distance data of an object at different object zones 210, and a 3D profile of the object 210 may be obtained. The control of the operation of robot body 110 may be based on the different distances of the object zones 210, and may be based on the 3D profile of the object 210.

Figure 6:
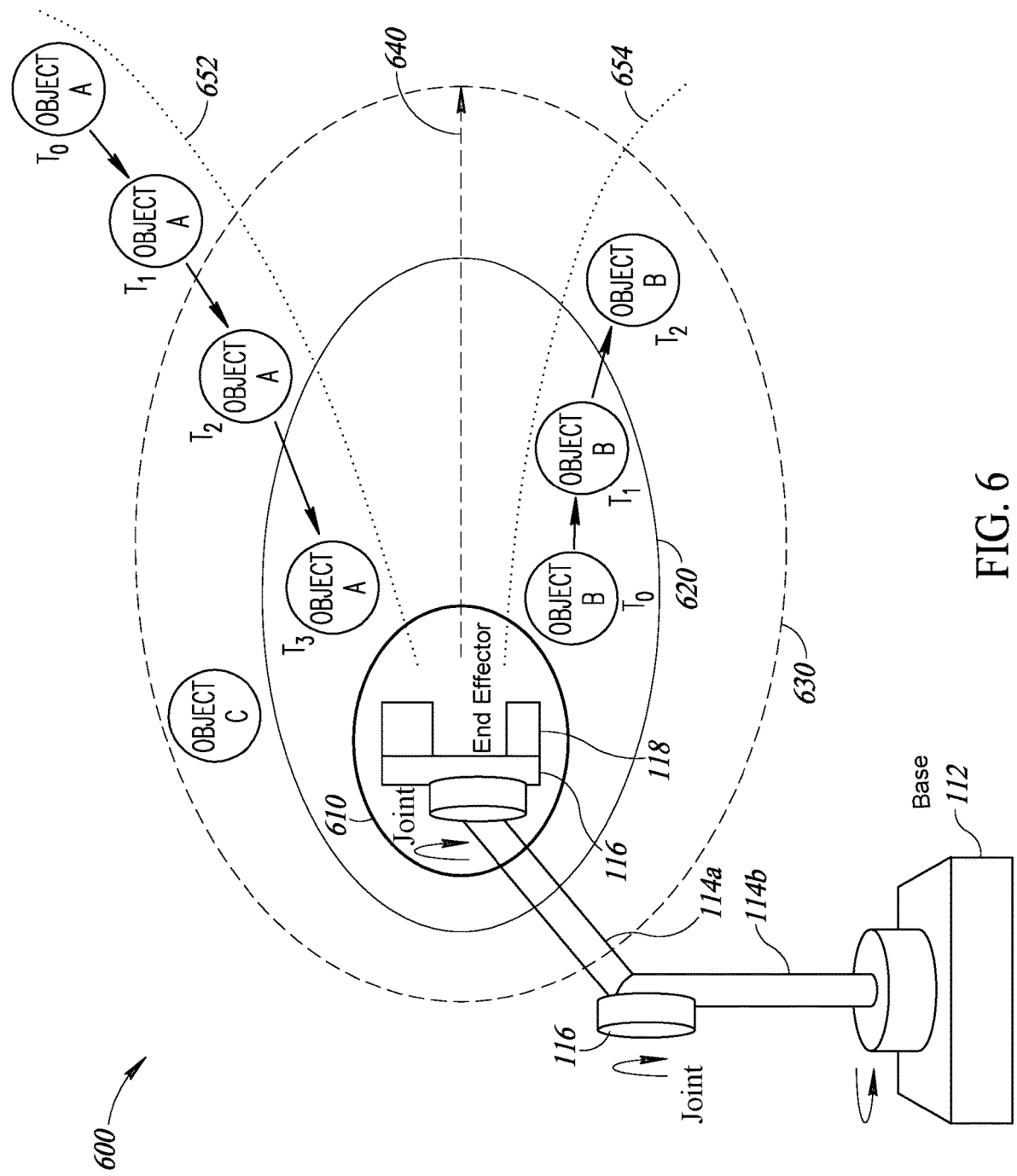
FIG. 6 illustrates example reaction zones of a robotic system.

FIG. 6 shows an example operation environment 600 of robot body 600 under control of controller 150 (not shown). Referring now to FIG. 6, robot controller 156 may define multiple reaction zones about robot body 110. The multiple reaction zones may be defined relative to a moveable portion 114. That is, for different moveable portions 114, different reaction zones may be defined. The reaction zones are defined in a manner that, when an object 210 is detected within a specific reaction zone, the corresponding reactions will be taken by robot body 110 under control of robot controller 156. FIG. 6 shows, as an illustrative example, a work zone 610, a critical zone 620, and a watch zone 630 defined relative to moveable portion 114a including end effector 118. As an illustrative example, the reaction zones 610, 620, 630 are defined based on a distance 640 to end effector 118 in different directions. That is, the border of each of zones 610, 620, 630 may have different distance to end effector 118 from different directions. For simplicity and illustrative purposes, in FIG. 6, reaction zones 610, 620, 630 are illustrated with two-dimensional eclipse-type shapes, which is not limiting. The reaction zones may be any two-dimensional or three-dimensional spheres with various shapes, which are all included in the disclosure. The fast detection and computation capacity of time-of flight proximity sensors 120 enables refined definition of reaction zones.

In an example, as reaction zones 610, 620, 630 are defined with respect to the corresponding moveable portion 114a, when a base of the corresponding moveable portion (here moveable portion 114b) moves, the reaction zones 610, 620, 630 also move. When the moveable portion 114b stays fixed, the reaction zones 610, 620, 630 may not change with the movement of the corresponding moveable portion 114a because the setting up of reaction zones 610, 620, 630 already considered the movement of the corresponding moveable portion 114a.

Robot controller 156 may control operations of robot body 110 based on a detected distance of an object 210 mapped into the reaction zones. For example, robot controller 156 may control an operation speed of moveable portion 114a based on the detected distance of object 210 mapped within zones 610, 620 or 630. It should be appreciated that, although the reaction zones 610, 620 and 630 are defined relative to moveable portion 114a, it does not mean that robot controller 156 will only control the operation of moveable portion 114a in response to an object 210 being detected within one of the reaction zones 610, 620, 630. Robot controller 156 may also control the operation of other moveable portions 114 and base 112 in response to an object 210 being detected within a reaction zone 610, 620, 630 defined with respect to moveable portion 114a. For example, for an object 210 detected within watch zone 630 and outside critical zone 620, robot controller 156 may control robot body 110 to remain the normal operation speed for moveable portion 114a and may alarm at least one of robot body 110 and the detected object 210 if a movement of the relative base of moveable portion 114a, e.g., moveable portion 114b and base 112 is moving toward the detected object 210.

If an object 210 is detected within critical zone 620 and outside work zone 610, robot controller 156 can adjust a speed of movement of the moveable portion 114a to avoid a collision with the object. The robot controller 156 can, for example, control robot body 110 to reduce the operation speed of moveable portion 114a. Alternatively, if the moveable portion is already on a path away from the object, or the trajectory of the object, the controller may not change the path or may speed up the movement of the moveable portion along the existing path if that trajectory is away from the possible collision.

If an object 210 is detected within work zone 610, robot controller 156 may control robot body 110 to pause the operation of moveable portion 114a.

In an example, robot controller 156 may control a reaction of robot body 110 based on a determined movement path of the object 210 as compared to a movement trajectory of moveable portion 114a in controlling robot body 110. The movement path of object 210 may include a movement direction of object 210. For example, as shown in FIG. 6, the movement path 652 of object A may be estimated as approaching the work zone 610 of moveable portion 114a based on the detected distances/positions detected from T0 to T3. The movement path 654 of object B may be estimated as leaving watch zone 630 based on the positions/distances detected from T0 to T2. Object C may be detected as being stable (not moving) within watch zone 630. Further, the determination of a movement path of object 210 may include determining a movement speed of object 210. With the determined movement path of object 210 and the movement trajectory of moveable portion 114a, robot controller 156 may further refine the control of robot body 110.

Further, the mapping of the detected distance of object 210 into the reaction zones also helps the control of proximity sensing systems 120 by at least one of sensor controller 154 or coordination controller 158 as described herein.

With multiple proximity sensing systems 120 are attached to different portions of robot body 110, the distance readings of different proximity sensing systems 120 may not be fully consistent with one another. Each of these proximity sensors may have different distances or detection zones that they monitor. For example, a sensor on moveable portion 114b may be a first distance threshold detector, such as a distance that is a distance past a boundary of the watch zone 630. The sensor on the moveable portion 114b may have a larger range than the sensors on moveable portion 114a and may act as a first detection, a warning that an object may be moving towards the watch zone.

Alternatively or in addition, the sensor on the movable portion 1114b may be angled to have a field of view that does not overlap with the field of view of the sensors on the moveable portion 114a. Having a different field of view, such as toward the floor allows for detection of object that may not be within the watch zone 630 or closer to the end effector 118. The controller takes the various data point regarding an environment around the robot body to make decisions about movement of the various moveable portions.

In an example, robot controller 156 may assign different priorities to the distance readings from different proximity sensing systems 120 based on the detected distance of object 210. For example, if the detected distance is smaller than a fifth threshold distance, proximity sensing system 120a attached to moveable portion 114a may have a priority over proximity sensing system 120b attached to moveable portion 114b, which is a base for moveable portion 114a. When the detected distance of object 210 is greater than the fifth threshold distance, proximity sensing system 120b attached to moveable portion 114b may have a priority over proximity sensing system 120a attached to moveable portion 114a. Such configuration may help to ensure that in an urgent scenario, namely object 210 is very close to end effector 118, the more straightforward information obtained by sensors closer to the involved robot portion, i.e., moveable portion 114a, is first considered. In a less urgent scenario, readings of proximity sensors attached to a relatively fixed portion of robot body 110, i.e., proximity sensors 120 attached to moveable portion 114b, may be able to obtain more comprehensive information about an object 210.

Referring back to FIG. 1, coordination controller 158 may be configured to coordinate the control of robot body 110 and the control of proximity sensing systems 120. Coordination control unit 158 may achieve the coordination of the controls through communication with at least one of sensor controller 154 or robot controller 156. Coordination control unit 158 may also directly control the operation of at least one of proximity sensing systems 120 or robot body 110. In an example, coordination controller 158 may be configured to compare a detected 3D profile of an object 210 with a stored parameter 3D profile of known object categories to determine a category/classification of the detected object 210.

Figure 7:
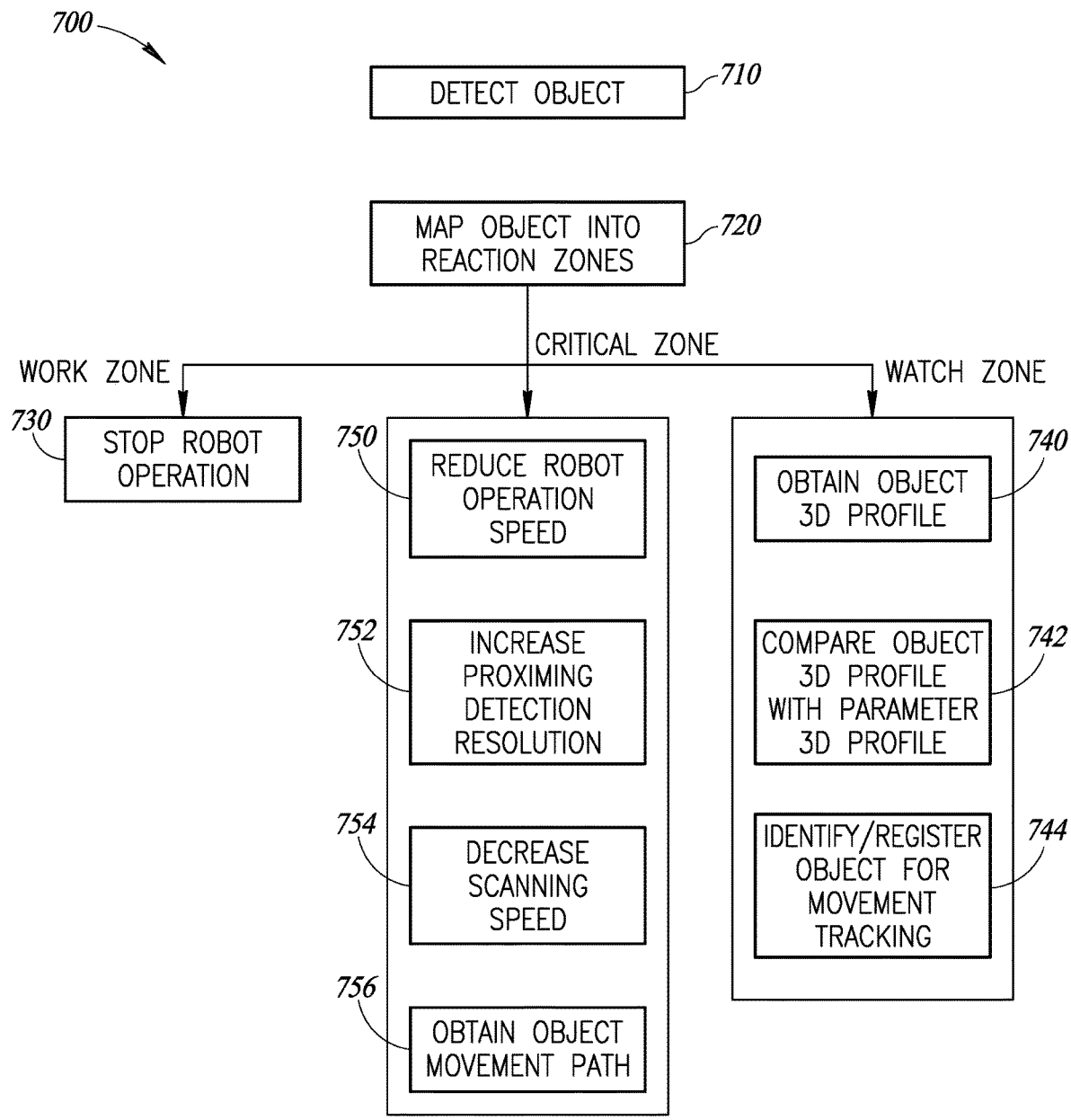
FIG. 7 illustrates an example operation process of operating a robotic system.

FIG. 7 shows an example operation process 700. Referring to FIG. 7, in example operation 710, one or more proximity sensing systems 120 (or one or more proximity sensors thereof) may detect a distance of an object 210. The distance may include multiple distance values detected by multiple proximity sensors 120 or may include multiple distance values detected by a single proximity sensor 120, e.g., a time-of-flight proximity sensor.

In example operation 720, proximity measurement receiver 152 may receive the detected distance of object 210 from proximity sensing systems 120 and may map the received distance into the reaction zones of various moveable portions 114 of robot body 110. As described herein, different reaction zones may be defined relative to different moveable portions 114 of robot body 110. Proximity measurement receiver 152 may map the received distance of object 210 into different zones of different moveable portions 114 for further processing and the related control of at least one of proximity sensing systems 120 or robot body 110.

In the description herein, reaction zones of example moveable portion 114a may be used as an illustrative example.

Referring to FIGS. 6-7 together, if the detected distance is mapped into work zone 610, robot controller 156 may control robot body 110 to stop the operation, e.g., movement, of moveable portion 114a, in example operation 730.

If the detected distance of object 210 is mapped into watch zone 630, robot controller 156 may control robot body 110 to maintain the normal operation of the status quo operation state, e.g., robot body 110 may already be operating under a reduced speed state due to other detected object 210. At the same while, sensor controller 154 may control one or more proximity sensing systems 120 to obtain a 3D profile of object 210, in example operation 740. As described herein, the obtaining a 3D profile of object 210 may include adjusting the detection ranges of one or more proximity sensors 120 based on the detected distance of object 210.

In example operation 742, coordination controller 158 may compare the obtained 3D profile of object 210 with stored parameter 3D profiles to determine a category/classification of object 210. For example, based on the comparison result, coordination controller 158 may be able to determine whether the object 210 is an object to be avoided, e.g., a human being, an obstacle, or an object to be worked with, e.g., to grab by end effector 118. The parameter 3D profiles may be pre-determined and stored in relation to control system 150 and may be continuously and dynamically updated. For different operation scenarios of robot system 100, different parameter 3D profiles may be applied.

In example operation 744, robot controller 156 may identify and register object 210 (that is detected within watch zone 630) in a watch list for further distance detection analysis. For example, robot controller 156 may register the object 210 as a potential target for tracking a movement path.

If object 210 is detected within critical zone 620, robot controller 156 may control robot body 110 to reduce operation speed of moveable portion 114*a* and other portions of robot body 110, in example operation 750. In an example, robot body 110 may include two or more speed profiles as operation modes. When an object 210 is detected within critical zone 620, robot controller 156 may not stop the operation of robot body 110, and may switch or maintain its operation on a lower speed mode.

Further, for an object 210 within critical zone 620, sensor controller 154 may control proximity sensing system 120 to increase the proximity detection/reading resolution on the object 210, in example operation 752. The increased detection resolution may include an increased spatial resolution by increasing the number of proximity sensor 120 readings on object 210. The increased detection resolution may include an increased detection frequency on object 210.

Alternatively or additionally, sensor controller 154 may control proximity sensing system 120 to reduce the scanning speed relevant to object 210 within critical zone 620 such that more distance readings may be obtain on object 210, in example operation 754

Further, for an object 210 within critical zone 620, robot controller 156 may start tracking and obtaining the movement path including movement direction and movement speed of object 210, in example operation 756. The movement path of object 210 may be compared with a movement trajectory of moveable portion 114*a* of robot body 110 to determine further reactions to object 210 being in critical zone 620.

In an example, a proximity sensor 120 is a time-of-flight proximity sensor. Time-of-Flight range imaging measures a depth of a 3D object 210 by calculating a time duration that an emitted light takes to travel to and bounce back from the 3D object 210. For example, a continuously-modulated invisible light wave, e.g., a laser or an infrared (IR) light beam, is emitted from a light emitting unit, and the phase delay between the received bounce-back light and the original emitted light is detected and calculated to determine the depth, i.e., a distance between a time-of-flight sensor and the object.

A time-of-flight proximity sensor 120 may include a Single Photon Avalanche Diode (SPAD), which is a p-n junction device biased beyond its breakdown region.

Figure 8:
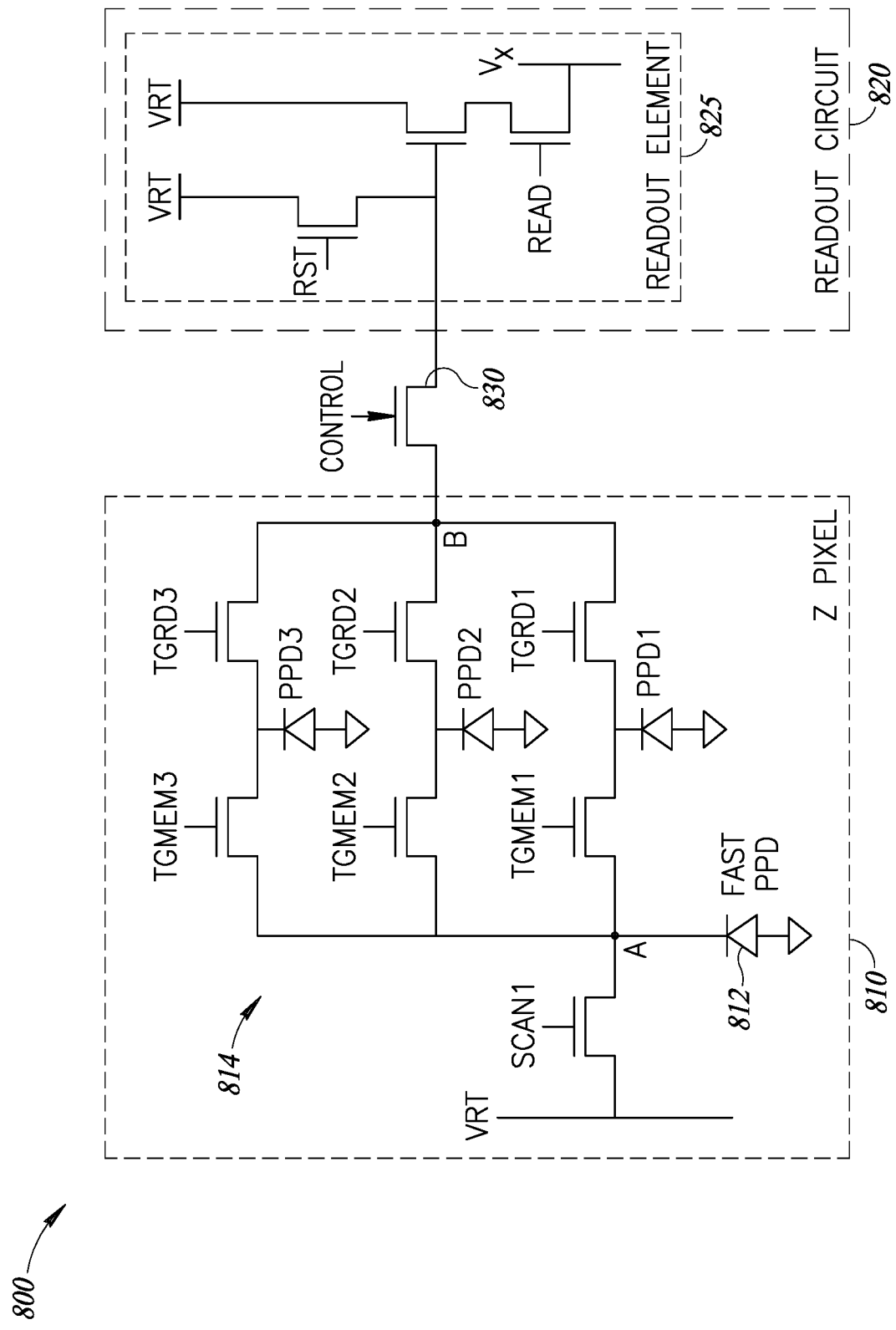
FIG. 8 illustrates an example time-of-flight proximity sensor.

Referring to FIG. 8, an example circuit implementation of a pixel 800 ("Z" pixel) of a time-of-flight proximity sensor 120 is shown. As shown in FIG. 8, example circuit implementation 800 includes an example range pixel circuit 810, an example readout circuit 820 and a readout switch 830.

Range pixel circuit 810 includes a fast pinned photodiode (FAST PPD) 812, e.g., a pinned single photo avalanche diode (SPAD), coupled to a 3-bin demodulation unit 814. Demodulation unit 814 includes three in-parallel transfer-to-memory gates (TGMEM1, TGMEM2, TGMEM3) modulated (through gate control signals) with an out-of-phase angle of 120° among one another, three diodes (e.g., same type of pinned photodiode as FAST PPD 812) coupled to the gates TGMEM1, TGMEM2, TGMEM3, respectively, and functioning as memories to save the electrical potential at node "A", and three transfer-to-readout gates TGRD1, TGRD2, TGRD3 coupled to the memory photodiodes PPD1, PPD1, PPD3, respectively, to selectively output the saved electrical potential information of the three diodes at node "B".

Readout circuit 820 may include one or more readout element 825. One or more range pixel circuit 810 may share a same readout circuit 820 or a same readout element 825.

Other demodulation configurations are also possible and included in the disclosure. For example a 4-*bin* demodulation unit (with 90° our-of-phase angles) or a 2-*bin* demodulation unit (with 180° our-of-phase angles) are all possible configurations.

In operation, demodulation unit 814 is configured to sample the incoming modulated non-visible light wave, e.g., IR beam, three times per modulation period. Each sampling saves the photo-generated electrical potential at node "A" for the one third fraction of the modulation period under, e.g., a modulation frequency of 20 MHz. The saved sampled readings will be fed to a data processing unit through readout circuit 820 and the modulation signal will be reconstructed through data processing based on the sampled readings. Further elaboration of the data processing details are not required for the appreciation of the disclosure and may be omitted for simplicity purposes.

Switch 830 may be switched on/off by control signal "CONTROL" for distance readings of range pixel circuit 810 to be read or not to be read by readout circuit 820/readout element 825. Such control may be used to achieve the detecting resolution of measuring system 120 on an object 210. For example, sensor controller 154 may choose not to read and process readings of a range pixel circuit 810 to reduce the detection resolution and increase data processing speed and efficiency, e.g., for an object 210 detected as far away from robot body 110.

Figure 9:
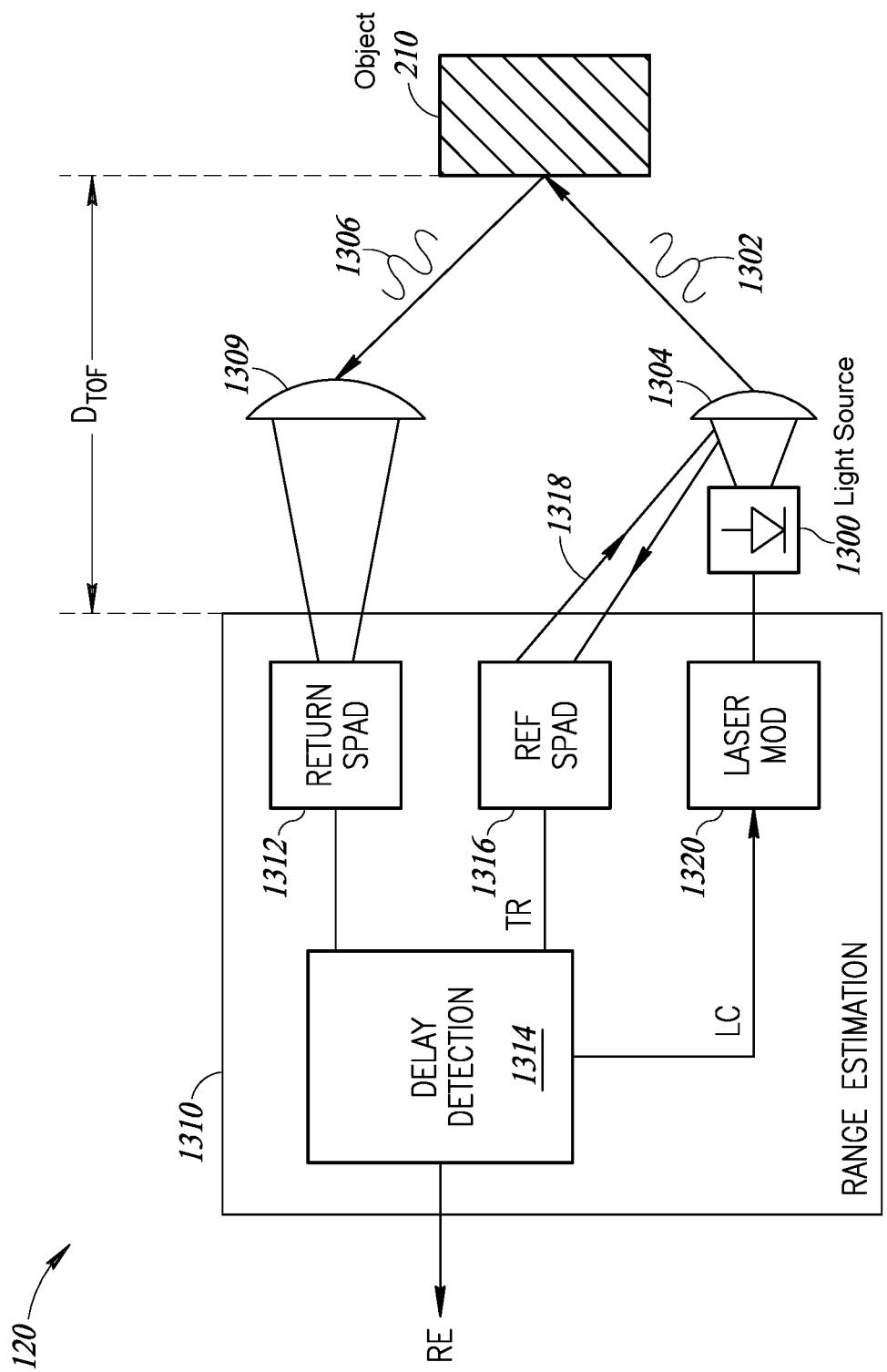
FIG. 9 illustrates a functional block diagram of an example time-of-flight proximity sensor.

FIG. 9 is an example functional block diagram of a time-of-flight (TOF) proximity sensor 120. In the example of FIG. 9, the TOF proximity sensor 120 includes a light source 1300, which is, for example, a laser diode such as a vertical-cavity surface-emitting laser (VCSEL) for generating the transmitted optical pulse signal designated as 1302 in FIG. 9. The transmitted optical pulse signal 1302 is transmitted in the detection range of the light source 1300. In the example of FIG. 9, the transmitted optical pulse signal 1302 is transmitted through a projection lens 1304 to focus the transmitted optical pulse signals 1302 so as to provide the desired detection range. Sensor controller 154 may be configured to adjust the projection lens 1304 to adjust the detection range of TOF proximity sensor 120. The projection lens 1304 is an optional component, with some examples of the sensor not including the projection lens.

The reflected or return optical pulse signal is designated as 1306 in FIG. 9 and corresponds to a portion of the transmitted optical pulse signal 1302 that is reflected off objects within the detection range. One such object 210 is shown in FIG. 9. The return optical pulse signal 1306 propagates back to the TOF proximity sensor 120 and is received through a return lens 1309 which provides another control for the detection range from the receiving side of TOF proximity sensor 120. The return lens 1309 directs the return optical pulse signal 1306 to range estimation circuitry 1310 for generating the imaging distance $D_{TOF}$ and signal amplitude SA for each object 210. The return lens 1309 is also an optional component and, thus, some examples of the TOF proximity sensor 120 may not include the return lens.

In the example of FIG. 9, the range estimation circuitry 1310 includes a return single-photon avalanche diode (SPAD) array 1312, which receives the returned optical pulse signal 1306 via the lens 1309. The SPAD array 1312 may include a large number of SPAD pixels, e.g., range pixel 800 of FIG. 8, each cell including a SPAD for sensing a photon of the return optical pulse signal 1306. In some examples of the TOF proximity sensor 120, the lens 1309 directs reflected optical pulse signals 1306 from separate spatial zones within the detection range of the sensor 120 to certain groups of SPAD pixels or zones of SPAD pixels in the return SPAD array 1312, as will be described in more detail below.

Each SPAD pixel in the return SPAD array 1312 provides an output pulse or SPAD event when a photon in the form of the return optical pulse signal 1306 is detected by that pixel in the return SPAD array. A delay detection and processing circuit 1314 in the range estimation circuitry 1310 determines a delay time between transmission of the transmitted optical pulse signal 1302 as sensed by a reference SPAD array 1316 and a SPAD event detected by the return SPAD array 1312. The reference SPAD array 1316 is discussed in more detail below. The SPAD event detected by the return SPAD array 1312 corresponds to receipt of the return optical pulse signal 306 at the return SPAD array. In this way, by detecting these SPAD events, the delay detection and processing circuit 1314 estimates an arrival time of the return optical pulse signal 306. The delay detection and processing circuit 1314 then determines the time of flight (TOF) based upon the difference between the transmission time of the transmitted optical pulse signal 1302 as sensed by the reference SPAD array 1316 and the arrival time of the return optical pulse signal 1306 as sensed by the SPAD array 1312. From the determined time of flight (TOF), the delay detection and processing circuit 1314 generates the range estimation signal RE indicating the detected distance $D_{TOF}$ between the object 210 and the TOF proximity sensor 120. As appreciated, the delay detection may be done directly on the time delay or indirectly through detecting phase difference in the modulated signals.

The reference SPAD array 1316 senses the transmission of the transmitted optical pulse signal 1302 generated by the light source 1300, and generates a transmission signal TR indicating detection of transmission of the transmitted optical pulse signal. The reference SPAD array 1316 receives an internal reflection 1318 from the lens 1304 of a portion of the transmitted optical pulse signal 1302 upon transmission of the transmitted optical pulse signal from the light source 1300. The reference SPAD array 1316 effectively receives the internal reflection 1318 of the transmitted optical pulse signal 1302 at the same time the transmitted optical pulse signal is transmitted. In response to this received internal reflection 1318, the reference SPAD array 1316 generates a corresponding SPAD event, and in response thereto generates the transmission signal TR indicating transmission of the transmitted optical pulse signal 1302.

The delay detection and processing circuit 1314 includes suitable circuitry, such as time-to-digital converters or time-to-analog converters, to determine the time duration between the transmission of the transmitted optical pulse signal 1302 and receipt of the reflected or return optical pulse signal 1306. The delay detection and processing circuit 1314 then utilizes this determined time delay to determine the distance $D_{TOF}$ between the object 210 and the TOF proximity sensor 120. The range estimation circuitry 1310 further includes a laser modulation circuit 1320 that drives the light source 1300. The delay detection and processing circuit 1314 generates a laser control signal LC that is applied to the laser modulation circuit 1320 to control activation of the laser 1300 and thereby control transmission of the transmitted optical pulse signal 1302. The range estimation circuitry 1310 also determines the signal amplitude SA based upon the SPAD events detected by the return SPAD array 1312. The signal amplitude SA is based on the number of photons of the return optical pulse signal 306 received by the return SPAD array 1312. The closer the object 210 is to the TOF proximity sensor 120, the greater the sensed signal amplitude SA, and, conversely, the farther away the object, the smaller the sensed signal amplitude.

Figure 10:
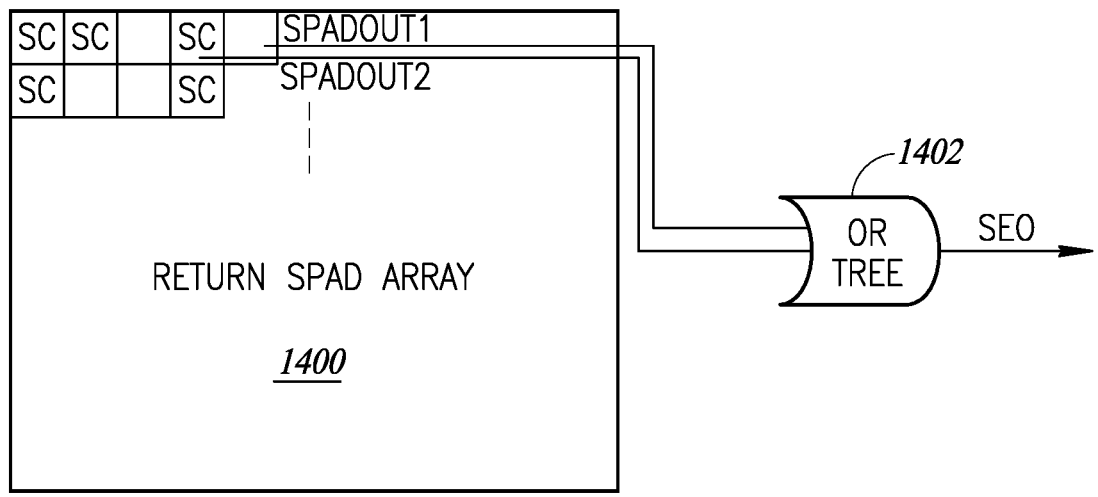
FIG. 10 illustrates a functional diagram of an example single zone time-of-flight proximity sensor.

FIG. 10 is a functional diagram of a single zone example of the return SPAD array 1312 of FIG. 9. In this example, the return SPAD array 1312 includes a SPAD array 1400 including a plurality of SPAD pixels SC, some of which are illustrated and labeled in the upper left portion of the SPAD array. Each of these SPAD pixels SC has an output, with two outputs labeled SPADOUT1, SPADOUT2 shown for two SPAD pixels by way of example in the figure. The output of each SPAD pixel SC is coupled to a corresponding input of an OR tree circuit 1402. In operation, when any of the SPAD pixels SC receives a photon from the reflected optical pulse signal 1306, the SPAD pixel provides an active pulse on its output. Thus, for example, if the SPAD pixel SC having the output designated SPADOUT2 in the figure receives a photon from the reflected optical pulse signal 306, then that SPAD pixel will pulse the output SPADOUT2 active. In response to the active pulse on the SPADOUT2, the OR tree circuit 1402 will provide an active SPAD event output signal SEO on its output. Thus, whenever any of the SPAD pixels SC in the return SPAD array 1400 detects a photon, the OR tree circuit 1402 provides an active SEO signal on its output. In the single zone example of FIG. 10, the TOF proximity sensor 120 may not include the lens 1309, and the return SPAD array 1312 corresponds to the return SPAD array 1400 and detects photons from reflected optical pulse signals 1306 within the single detection range of the sensor.

Figure 11:
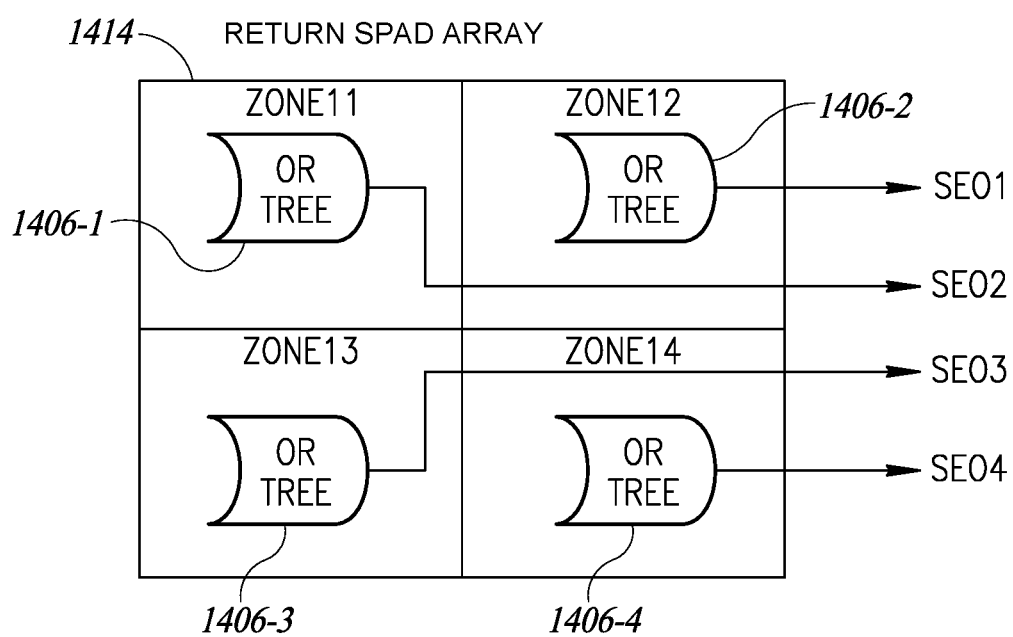
FIG. 11 illustrates a functional diagram of a multi-zone time-of-flight proximity sensor.

FIG. 11 is a functional diagram of a multi-zone example of the return SPAD array 1312 FIG. 9. In this example, the return SPAD array 1312 includes a return SPAD array 1414 having four array zones ZONE11-ZONE14, each array zone including a plurality of SPAD pixels. Four zones ZONE11-ZONE14 are shown by way of example and the SPAD array 1414 may include more or fewer zones. A zone in the SPAD array 1414 is a group or portion of the SPAD pixels SC contained in the entire SPAD array. The SPAD pixels SC in each zone ZONE11-ZONE14 have their output coupled to a corresponding OR tree circuit 1406-1 to 1406-4. The SPAD pixels SC and outputs of these pixels coupled to the corresponding OR tree circuit 1406-1 to 1406-4 are not shown in FIG. 11 to simplify the figure.

In this example, each of zones ZONE11-ZONE14 of the return SPAD array 1414 effectively has a smaller sub-detection range corresponding to a portion of the overall detection range of, e.g., the example sensor 120 of FIG. 10. The return lens 1309 of FIG. 9 directs return optical pulse signals 1306 from the corresponding spatial zones or sub-detection ranges within the overall detection range to corresponding zones ZONE11-ZONE14 of the return SPAD array 1414. In operation, when any of the SPAD pixels SC in a given zone ZONE11-ZONE14 receives a photon from the reflected optical pulse signal 1306, the SPAD pixel provides an active pulse on its output that is supplied to the corresponding OR tree circuit 1406-1 to 1406-4. Thus, for example, when one of the SPAD pixels SC in the zone ZONE11 detects a photon that SPAD pixel provides an active pulse on its output and the OR tree circuit 1406-1, in turn, provides an active SPAD event output signal SEO1 on its output. In this way, each of the zones ZONE11-ZONE14 operates independently to detect SPAD events (i.e., receive photons from reflected optical pulse signals 306 in FIG. 9).

Figure 12:
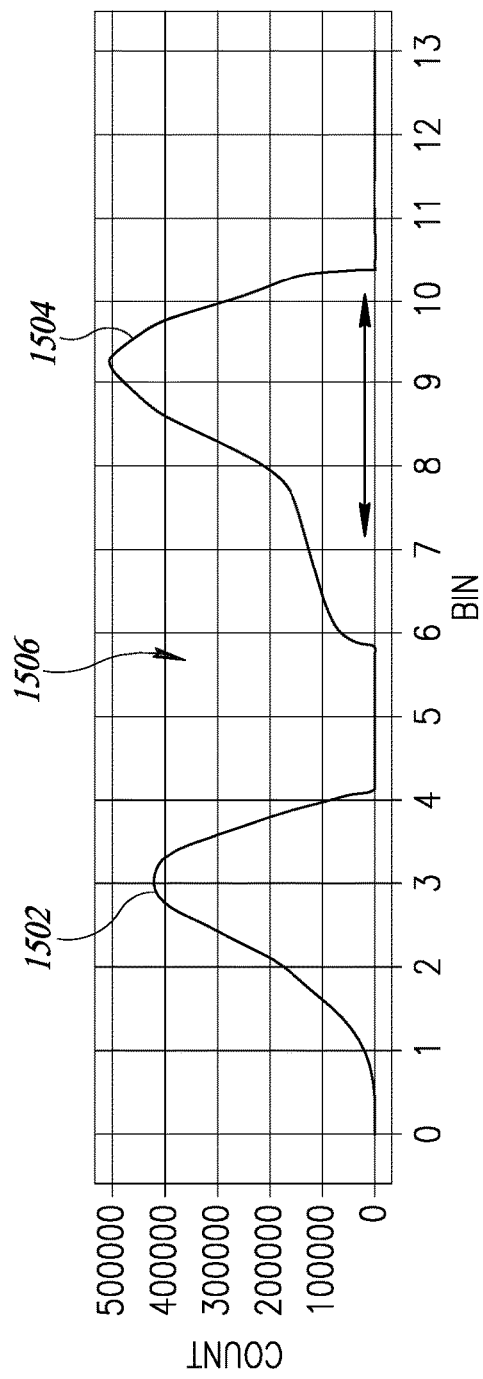
FIGS. 12 and 13 are example graphs illustrating operations of an example time-of-flight proximity sensor.
Figure 13:
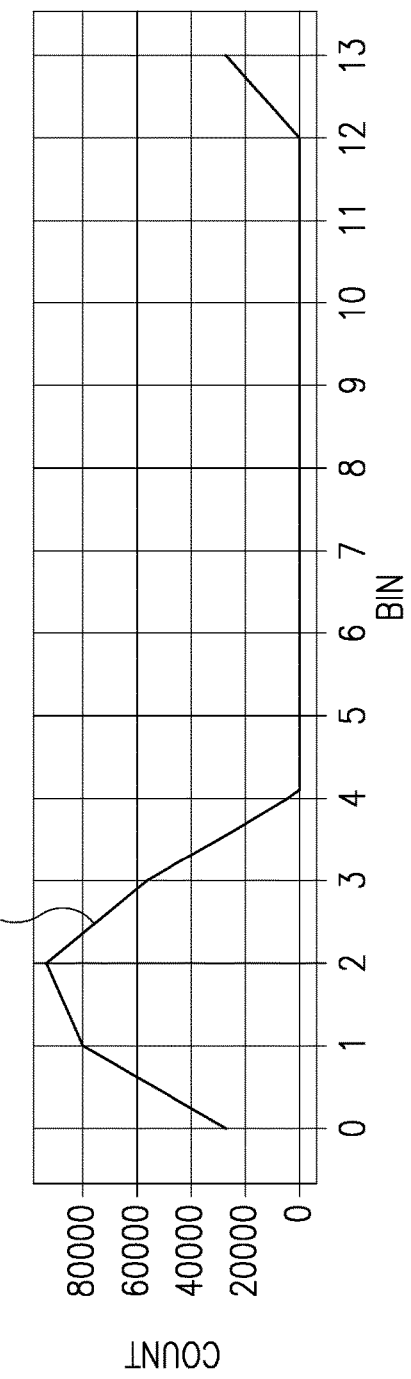

FIGS. 12 and 13 are graphs illustrating operation of the TOF proximity sensor 120 in detecting multiple objects. The graphs of FIGS. 12 and 13 are signal diagrams showing a number of counts along a vertical axis and time bins along a horizontal axis. The number of counts indicates a number of SPAD events that have been detected in each bin, as will be described in more detail below. These figures illustrate operation of a histogram-based proximity technique implemented by the TOF proximity sensor 120. This histogram-based proximity technique allows the TOF proximity sensor 120 to sense or detect multiple objects within the detection range of the TOF proximity sensor.

Figure 14:
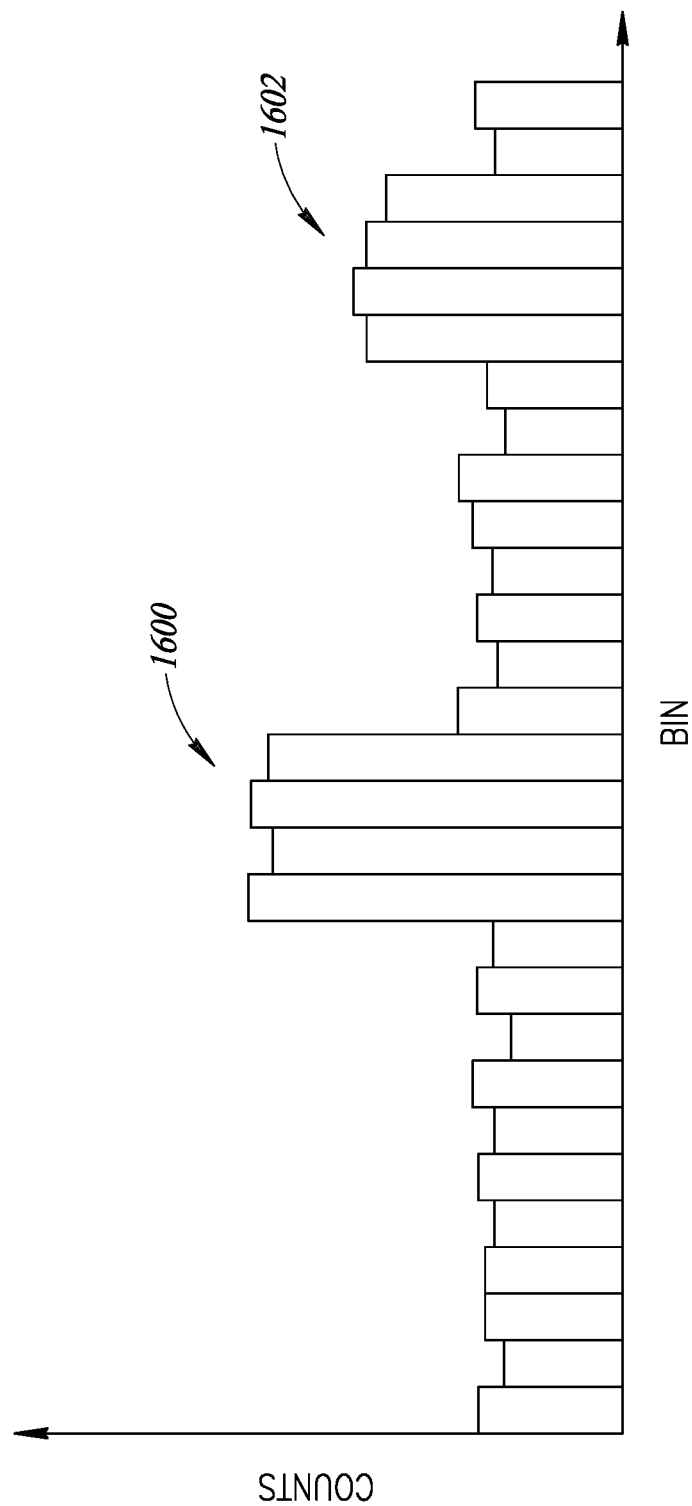
FIG. 14 illustrates an example histogram generated by an example time-of-flight proximity sensor.

This histogram-based proximity technique is now described in more detail with reference to FIGS. 9, 10, 11, 12 and 13. In this technique, more than one SPAD event is detected in each cycle of operation, where the transmitted optical pulse signal 1302 is transmitted in each cycle. SPAD events are detected by the return SPAD array 1312 (i.e., return SPAD array 1400 or 1414 of FIGS. 10, 11) and reference SPAD array 1316, where a SPAD event is an output pulse provided by the return SPAD array indicating detection of a photon. Thus, an output pulse from the OR tree circuit 1402 of FIG. 10 or one of the OR tree circuits 1406-1 to 1406-4 of FIG. 11. Each pixel in the SPAD arrays 1312 and 1316 will provide an output pulse or SPAD event when a photon is received in the form of the return optical pulse signal 1306 for target SPAD array 1312 and internal reflection 1318 of the transmitted optical pulse signal 1302 for the reference SPAD array 1316. By monitoring these SPAD events an arrival time of the optical signal 1306, 1318 that generated the pulse can be determined. Each detected SPAD event during each cycle is allocated to a particular bin, where a bin is a time period in which the SPAD event was detected. Thus, each cycle is divided into a plurality of bins and a SPAD event detected or not for each bin during each cycle. Detected SPAD events are summed for each bin over multiple cycles to thereby form a histogram in time as shown in FIG. 14 for the received or detected SPAD events. The delay detection and processing circuit 1314 of FIG. 9 or other control circuitry in the TOF proximity sensor 120 implements this histogram-based technique in one example of the sensor.

FIGS. 12 and 13 illustrate this concept over a cycle. Multiple pixels in each of the SPAD arrays 1312 and 1316 may detect SPAD events in each bin, with the count of each bin indicating the number of such SPAD events detected in each bin over a cycle. FIG. 13 illustrates this concept for the internal reflection 1318 of the transmitted optical pulse signal 1302 as detected by the reference SPAD array 1316. The sensed counts (i.e., detected number of SPAD events) for each of the bins shows a peak 1500 at about bin 2, with this peak being indicative of the transmitted optical pulse signal 1302 being transmitted. FIG. 12 illustrates this concept for the reflected or return optical pulse signal 1306, with there being two peaks 1502 and 1504 at approximately bins 3 and 9. These two peaks 1502 and 1504 (i.e., detected number of SPAD events) indicate the occurrence of a relatively large number of SPAD events in the bins 3 and 9, which indicates reflected optical pulse signals 1306 reflecting off a first object causing the peak at bin 3 and reflected optical pulse signals reflecting off a second object at a greater distance than the first object causing the peak at bin 9. A valley 1506 formed by a lower number of counts between the two peaks 1502 and 1504 indicates no additional detected objects between the first and second objects. Thus, the TOF proximity sensor 120 is detecting two objects 210 within the detection range. The two peaks 1502 and 1504 in FIG. 12 are shifted to the right relative to the peak 1500 of FIG. 13 due to the time-of-flight of the transmitted optical pulse signal 1302 in propagating from the TOF proximity sensor 120 to the two objects 210 within the detection range but at different distances from the TOF proximity sensor.

FIG. 14 illustrates a histogram generated by TOF proximity sensor 120 over multiple cycles. The height of the rectangles for each of the bins along the horizontal axis represents the count indicating the number of SPAD events that have been detected for that particular bin over multiple cycles of the TOF proximity sensor 120. As seen in the histogram of FIG. 14, two peaks 1600 and 1602 are again present, corresponding to the two peaks 1602 and 1604 in the single cycle illustrated in FIG. 12. From the histogram of FIG. 14, the TOF proximity sensor 120 determines a distance to each of two objects 210 in the detection range of the TOF proximity sensor 120. In addition, the TOF proximity sensor 120 also generates the signal amplitude SA for each of the objects 210 based upon these counts, namely the number of photons or SPAD events generated by the return SPAD array 1312 in response to the return optical pulse signal 306.

Figure 15:
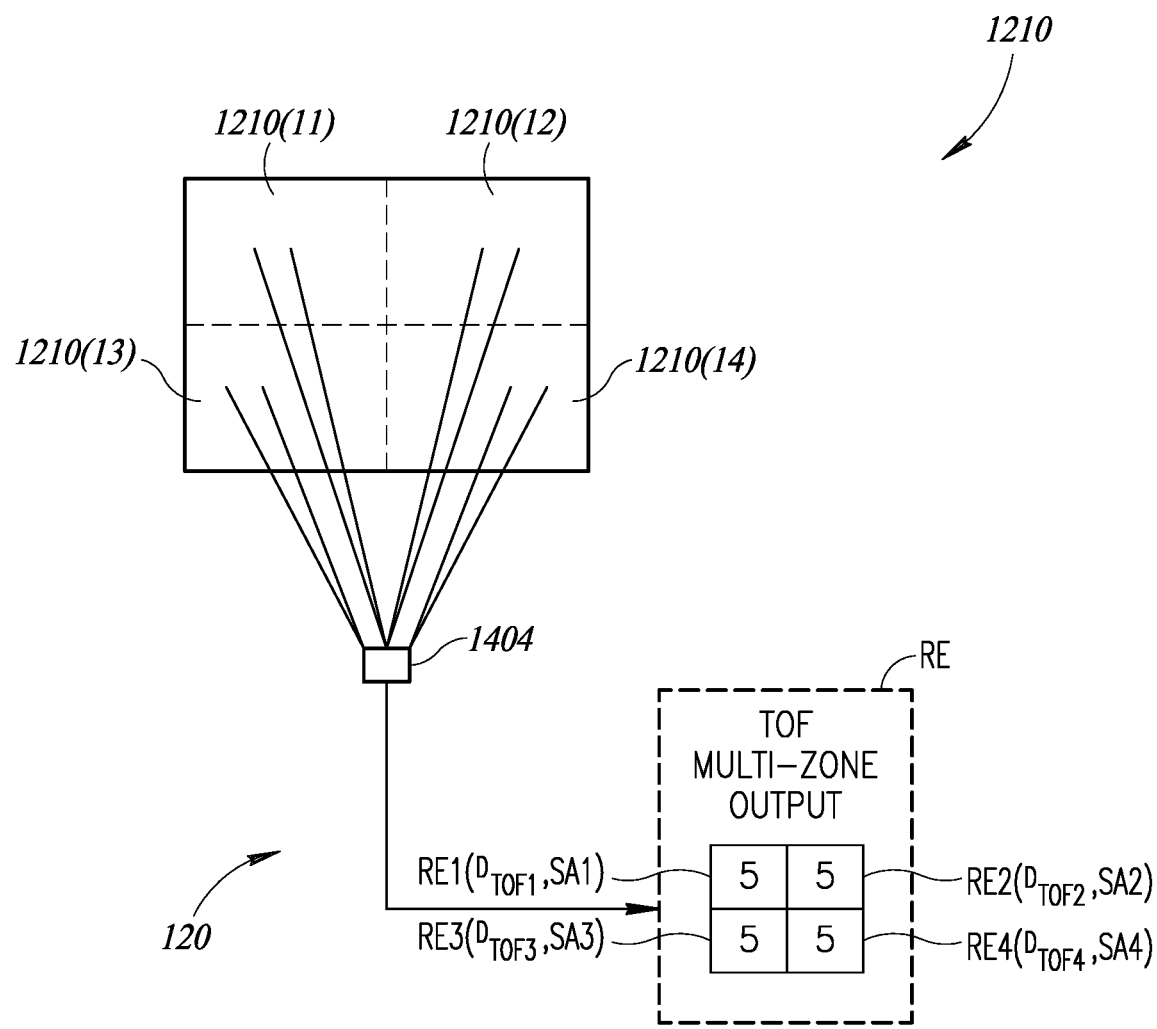
FIG. 15 illustrates a diagram illustrating an operation environment of an example multi-zone time-of-flight proximity sensor.

FIG. 15 is a diagram illustrating multiple spatial zones within the detection range where the TOF proximity sensor 120 is a multi-zone sensor including the return SPAD array 1414 of FIG. 11. In such a multi-zone TOF proximity sensor 120 as functionally illustrated in FIG. 15, the return lens 1309 (FIG. 9) is configured to route return optical pulse signals 1306 from each of the object zones 1210 (11) to 1210(14) within the overall detection range 1210 of TOF proximity sensor 120 to a corresponding array zone ZONE11-ZONE14 of the return SPAD array 1414 of FIG. 4B. This is represented in the figure through the pairs of lines 1700 shown extending from the return SPAD array 1414 to each of the object zones 1210(11)-1210(14).

Each of the array zones ZONE11-ZONE14 outputs respective SPAD event output signals SEO1-SEO4 as previously described with reference to FIG. 11, and the TOF proximity sensor 120 accordingly calculates four different imaging distances $D_{TOF1}$-$D_{TOF4}$, one for each of the object zones 1210(11)-1210(14). Thus, in this example the range estimation signal RE generated by the TOF proximity sensor 120 includes four different values for the four different detected imaging distances $D_{TOF1}$-$D_{TOF4}$. Each of these detected imaging distances $D_{TOF1}$-$D_{TOF4}$ is shown as being part of the generated range estimation signal RE to have an example value "5". This would indicate objects in each of the object zones 1210(11)-1210(14) are the same distance away, or indicate that the object is relatively flat within the detection range of the TOF proximity sensor 120.

As the description illustrates, a single TOF proximity sensor 120 may achieve the multi-zone distance detection and may be able to obtain the 3D profile of a portion of an object 210 within the detection range 1210 of the single TOF proximity sensor 120. Sensor controller 154 may control the routing of the return optical pulse signals 1306 to adjust the detection range 1210 (or sub-detection ranges) of a single TOF proximity sensor 120. Therefore, proximity sensing system 120 may include multiple TOF proximity sensors 120 each having multi-zone detection capacity and may include a single TOF proximity sensor having more powerful multi-zone detection capacity, which are all included in the disclosure.

The various examples described above can be combined to provide further examples. All of the U.S. patents, U.S. patent application publications, U.S. patent applications, foreign patents, foreign patent applications and non-patent publications referred to in this specification or listed in the Application Data Sheet are incorporated herein by reference, in their entirety. Aspects of the examples can be modified, if necessary to employ concepts of the various patents, applications and publications to provide yet further examples.

These and other changes can be made to the examples in light of the above-detailed description. In general, in the following claims, the terms used should not be construed to limit the claims to the specific examples disclosed in the specification and the claims, but should be construed to include all possible examples along with the full scope of equivalents to which such claims are entitled. Accordingly, the claims are not limited by the disclosure.

What is claimed is:

1. A method, comprising:
receiving, from a time-of-flight proximity sensor system coupled to a movable device, a first distance of an object measured from a first time-of-flight proximity sensor of the time-of-flight proximity sensor system and a second distance of the object measured from a second time-of-flight proximity sensor of the time-of-flight proximity sensor system;
analyzing the first distance with respect to the second distance; and
controlling detection ranges of the first time-of-flight proximity sensor and the second time-of-flight proximity sensor based on the first distance and the second distance and based on a result of the analyzing,
wherein the controlling the detection ranges includes moving the detection ranges of the first time-of-flight proximity sensor and the second time-of-flight sensor either closer together or further apart based on a difference between the first distance and the second distance, and
wherein the controlling the detection ranges includes moving the detection ranges linearly in a first direction by tilting or rotating at least one of the first time-of-flight proximity sensor or the second time-of-flight proximity sensor.

2. The method of claim 1, wherein the analyzing the first distance with respect to the second distance includes:
determining a three-dimensional profile of the object based on the first distance and the second distance; and
determining a classification of the object by comparing the three-dimensional profile of the object with a parameter three-dimensional profile.

3. The method of claim 1, comprising, in a time sequence, saving information related to the first distance of the object detected by the first time-of-flight proximity sensor as an electrical potential in a first diode and saving information related to the second distance of the object detected by the second time-of-flight proximity sensor as electrical potential in a second diode.

4. The method of claim 1, comprising controlling a movement of the moveable device based on at least one of the first distance or the second distance and based on a result of the analyzing.

5. The method of claim 4, wherein the receiving includes receiving, from the time-of-flight proximity sensor system, a series of distances detected by one or more of the first time-of-flight proximity sensor or the second time-of-flight proximity sensor in a time sequence.

6. The method of claim 5, comprising determining a movement speed of the object based on the series of distances in the time sequence.

7. The method of claim 5, comprising determining a movement path of the object based on the series of distances in the time sequence.

8. The method of claim 7, comprising:
comparing the movement path of the object with a movement trajectory of the moveable device,
wherein the controlling the movement of the moveable device includes controlling the movement of the moveable device based on a result of the comparing.

9. The method of claim 5, comprising controlling at least one of a scanning speed, detection frequency, or spatial resolution of the proximity sensing system based on the multiple distances of the object.

10. The method of claim 4, wherein the first time-of-flight proximity sensor and the second time-of-flight proximity sensor are positioned at two separate portions of the moveable device.

11. The method of claim 4, wherein the moveable device includes a moveable portion and a stationary portion, and the first time-of-flight proximity sensor and the second time-of-flight proximity sensor are positioned at the moveable portion and the stationary portion, respectively.

12. The method of claim 11, comprising setting a priority between the first distance and the second distance to be used in controlling the movement of the moveable device.

13. The method of claim 4, wherein the controlling the movement of the moveable device includes controlling a movement speed of the moveable device.

14. The method of claim 4, wherein the moveable device includes multiple reaction zones of movement, and the method further comprises mapping the object into a reaction zone of the multiple reaction zones based on at least one of the first distance or the second distance.

15. The method of claim 1, wherein the analyzing the first distance with respect to the second distance includes determining a three-dimensional profile of the object based on the first distance and the second distance.

16. The method of claim 1, wherein the first time-of-flight proximity sensor includes a light emitting element and a photonic diode-based light sensing element.

17. A method of controlling a robotic device having a movable portion and a proximity sensing system, comprising:
receiving, from the proximity sensing system, multiple distances of an object to the robotic device sensed by the proximity sensing system in a time sequence;
saving the multiple distances of the object as samples during the time sequence, the samples being saved as an electrical potential using diodes in the proximity sensing system;
determining a movement direction of the object based on the multiple distances;
comparing the movement direction of the object with a movement of the moveable portion of the robotic device; and controlling movement of the moveable portion based on a result of the comparing.

18. The method of claim 17, comprising controlling at least one of a scanning speed or a detection resolution of the proximity sensing system based on the multiple distances of the object.

19. A method of controlling a robotic device having a proximity sensing system, the proximity sensing system including a plurality of time-of-flight sensors, the method comprising:
   receiving, from the proximity sensing system, a plurality of distances of an object to the robotic device sensed by the plurality of time-of-flight sensors of the proximity sensing system in a time sequence;
   saving the plurality of distances of the object as samples during the time sequence, the samples being saved as an electrical potential using diodes in the proximity sensing system;
   determining a profile of the object based on a first set of distances of the plurality of distances that are sensed at a same time point in the time sequence;
   determining a movement path of the object based on a second set of distances of the plurality of distances that are sensed at different time points in the time sequence;
   controlling operations of the proximity sensing system and the plurality of time-of-flight sensors including controlling at least one of a detection range, a detection frequency, a detection resolution, or a scanning speed based on the profile and the movement path of the object; and
   controlling movement of the robotic device based on the profile and the movement path of the object.

20. The method of claim 19, wherein the first set of distances are sensed by different time-of-flight sensors of the plurality of time-of-flight sensors.

* * * * *